United States Patent [19]

Onodera

[11] Patent Number: 5,390,309
[45] Date of Patent: Feb. 14, 1995

[54] VIRTUAL ADDRESS TRANSLATION IN THREE LEVEL VIRTUAL MACHINE

[75] Inventor: Osamu Onodera, Hadano, Japan

[73] Assignee: Hitachi, Ltd., Tokyo, Japan

[21] Appl. No.: 736,022

[22] Filed: Jul. 25, 1991

[30] Foreign Application Priority Data

Jul. 30, 1990 [JP] Japan ................... 2-199042

[51] Int. Cl.⁶ ................... G06F 12/08; G06F 12/10
[52] U.S. Cl. ................... 395/400; 364/228.2; 364/255.1; 364/255.3; 364/255.7; 364/256.4; 364/256.5; 364/DIG. 1
[58] Field of Search ................... 395/400

[56] References Cited

U.S. PATENT DOCUMENTS

| | | | |
|---|---|---|---|
| 4,253,145 | 2/1981 | Goldberg . | |
| 4,456,954 | 6/1984 | Bullion, III et al. | 395/400 |
| 4,494,189 | 1/1985 | Bean et al. | 395/800 X |
| 4,695,950 | 9/1987 | Brandt et al. | 395/400 |
| 4,792,895 | 12/1988 | Tallman | 395/400 |
| 4,814,975 | 3/1989 | Hirosawa et al. | 395/800 X |
| 4,816,991 | 3/1989 | Watanabe et al. | 395/400 |
| 4,843,541 | 6/1989 | Bean et al. | 395/400 |
| 5,077,654 | 12/1991 | Ohtsuki | 395/800 X |
| 5,230,069 | 7/1993 | Brelsford et al. | 395/400 |

FOREIGN PATENT DOCUMENTS

3841602A1 6/1989 Germany .
57-212680 6/1982 Japan .
62-19949 1/1987 Japan .

OTHER PUBLICATIONS

"System/370 Extended Architecture: Facilities for Virtual Machines", IBM J. Res. Develop., vol. 27, No. 6, Nov. 1983.

*Primary Examiner*—Jack B. Harvey
*Assistant Examiner*—Michael A. Whitfield
*Attorney, Agent, or Firm*—Antonelli, Terry, Stout & Kraus

[57] ABSTRACT

A level-2 virtual machine is constructed under the control of a level-1 operating system (OS) operating on a real machine (level-1), and a level-3 virtual machine is constructed under the control of another operating system (OS) operating on the level-2 virtual machine. A level-3 virtual address generated in the level-3 virtual machine is translated to a level-2 virtual address, which is further translated to a level-1 virtual address. A third predetermined main storage address is added to the level-1 virtual address to generate a level-1 absolute address. The translated address is checked as to whether it is within a predetermined area on the main storage.

11 Claims, 18 Drawing Sheets

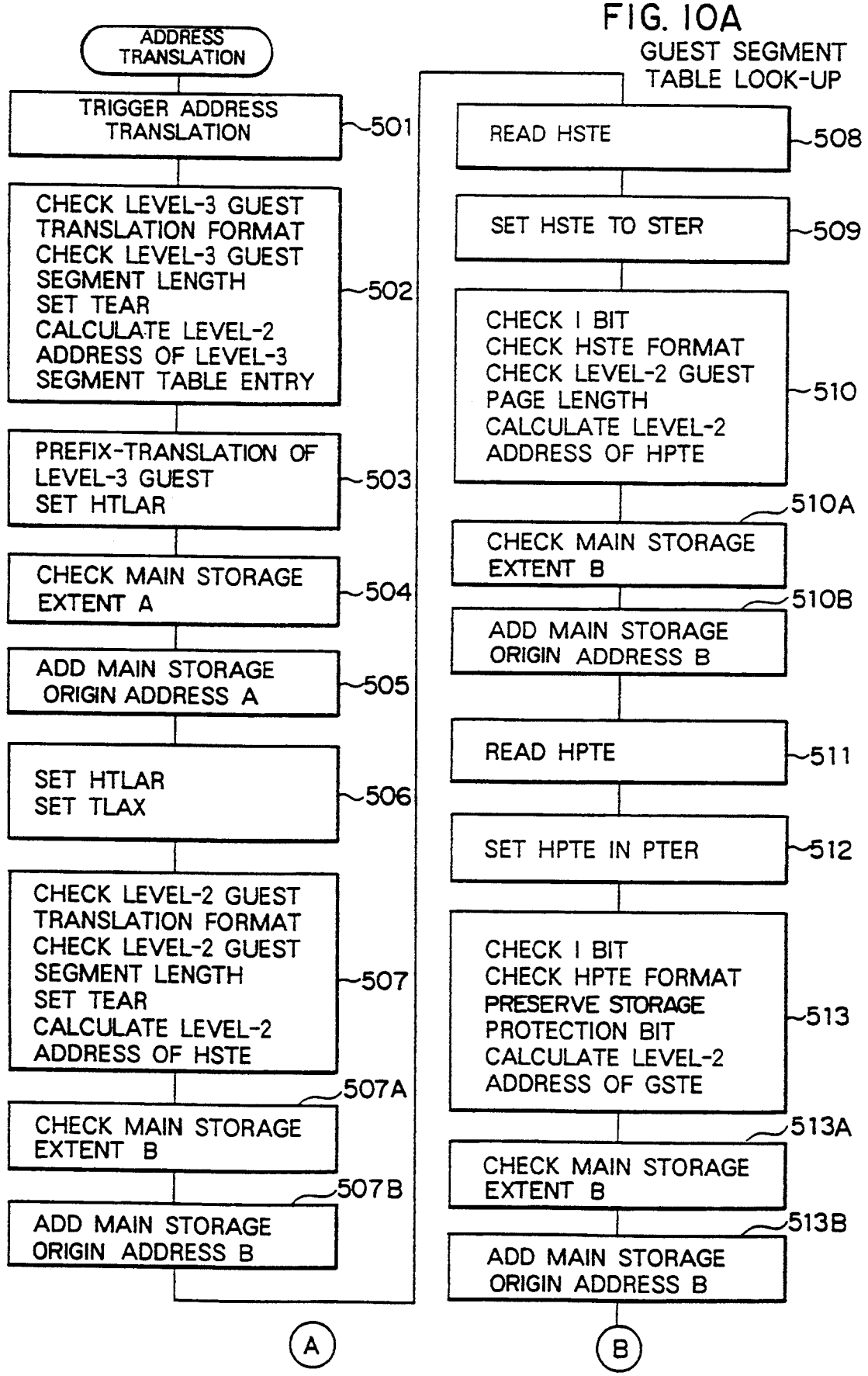

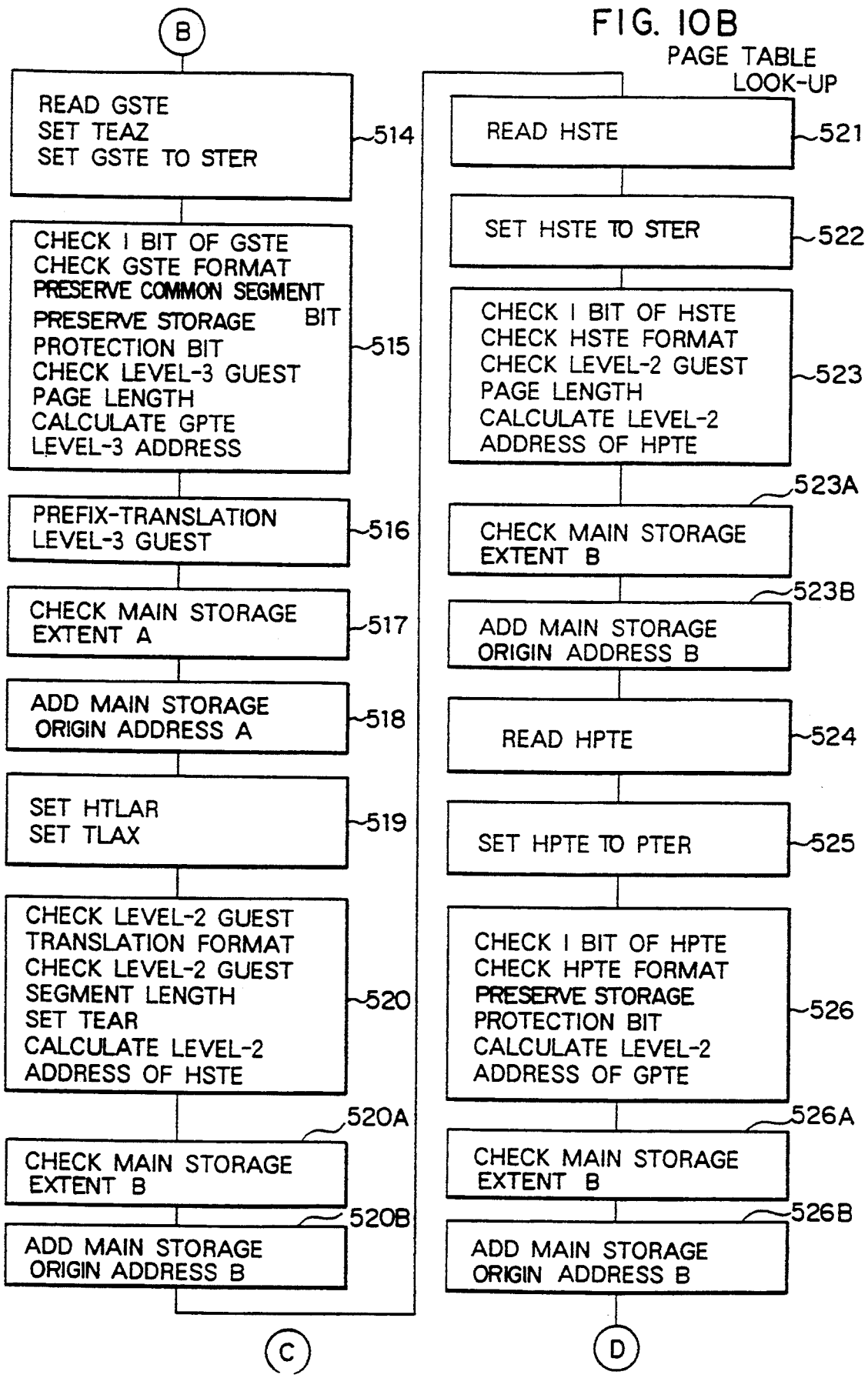

VIRTUAL ADDRESS TRANSLATION IN THREE LEVEL VIRTUAL MACHINE

BACKGROUND OF THE INVENTION

The present invention relates to an information processing system, and more particularly to a virtual machine system having an address translation function.

In an information processing system which uses a virtual memory system, it is necessary to translate a virtual address for the information processing system to access data or instruction on a main storage, to an absolute address on the main storage.

A prior art technique on general specification for the translation of the virtual address to the absolute address is described in the IBM publications, "IBM System 370 Principles of Operations" (GA-22-7000), "IBM System 370 Extended Architecture Principles of Operation" (SA 22-7085), and "IBM Enterprise System Architecture/370 Principles of Operation" (SA 22-7200).

Recently, an information processing system called a virtual machine system has been realized and commonly used. As shown in FIG. 1, the virtual machine system configures the information processing system such that a plurality of virtual machines are generated under one real machine. A virtual machine control program (VMCP) runs on the real machine and an operating system (OS) on the plurality of virtual machines is operated under the control of the VMCP.

As shown in FIG. 2, the OS which runs on the real machine (which is the VMCP and called a level-1 OS) prepares an address translation table by the level-1 OS, and the OS which runs on the virtual machine (level-2 OS) runs on a virtual address space (level-1 virtual main storage) on the level-1 OS.

Accordingly, in the prior art virtual machine system, in order to translate the level-2 OS virtual address to the level-1 OS absolute address, it is necessary to translate the address by using two address translation tables, one prepared by the level-1 OS and the other prepared by the level-2 OS. In the course of the address translation, as shown in FIG. 3, up to eight times of accessing to the address translation tables is usually required. Thus, when the address translation is to be achieved by a hardware logic, it increases a cost. Accordingly, the address translation is usually carried out by a microprogram called a virtual machine assist (VMA) or a shadow translation table which is a set of address translation table prepared by the level-1 OS by combining translation information of two sets of address translation tables as shown in FIG. 2.

In the method which uses the shadow translation table, the translation from the level-2 virtual address to the level-1 absolute address is quassi-performed by hardware like the translation from the level-1 virtual address to the level-1 absolute address so that the performance overhead in the address translation is reduced. However, there still remains an overhead in preparing the shadow translation table by the VMCP which is the level-1 OS. This overhead brings a non-negligible process performance reduction to the system.

A method for eliminating this overhead is the realization of two-step address translation by hardware. An address translation process therefor is shown in FIG. 3 and general specification thereof is described in the IBM publication "IBM System/370 Extended Architecture Interpretive Execution" (SA 22-7095). Technique on specific procedures to realize the specification is disclosed in JP-A-57-212680 and JP-A-62-19949.

In order to support the two-step address translation by the hardware, VMCP's of the level-1 OS and the level-2 OS are prepared as the virtual machine, and a level-3 OS is realized as a virtual machine under the control of the VMCP which is the level-2 OS. In this case, as shown in FIG. 4, the address translation is carried out by using three address translation tables. It is possible to fully support such a three-level address translation by hardware, but 32 times of accessing to the address translation tables or the main storage is required per address translation. This is a non-negligible problem with the performance and it is not practical because of the increase of the hardware cost.

A prior art technique on the specific method for implementing the three-step address translation is disclosed in U.S. Pat. No. 4,792,895.

In the disclosed prior art, the VMCP explained in connection with FIG. 4 is used as the level-1 OS and the level-2 OS, the level-3 OS is generated as a virtual machine under the control of the VMCP which is the level-2 OS, and a shadow translation table is prepared by combining the level-1 OS address translation table and the level-2 OS address translation table.

The method of converting the three-step address translation to the two-step address translation by using the shadow translation table can reduce the overehead caused in the address translation as described above, but there still remains an overhead for preparing the shadow translation table or maintenance, which is yet not negligible.

SUMMARY OF THE INVENTION

It is an object of the present invention to provide a virtual machine system which modifies a portion of a three-step address translation process to realize the three-step address translation without preparing a shadow translation table so that an overhead for preparing and maintaining the shadow translation table is eliminated and an overall performance is improved.

It is another object of the present invention to provide a virtual machine system which modifies a portion of the three-step address translation process to suppress the increase of the number of times of accessing to the address translation table in the address translation and the increase of an overhead in order to improve an efficiency.

It is a further object of the present invention to provide a virtual machine system which carries out the address translation of three or more steps without increasing the number of times of accessing to the address translation table.

It is still another object of the present invention to provide a virtual machine system having an address translation function of a high efficiency by the address translation which uses information which fits to the level of the address translation process.

It is an even further object of the present invention to provide a virtual machine system which prevents the accessing to an incorrect real storage area due to an error in an address translation table in the virtual machine.

In accordance with the present invention, the above objects are achieved by modifying the address translation methods in the respective processes of the three-step address translation, translating the address by a method which does not use an address translation table in the level-1 OS, and attaining the apparent three-step address translation while suppressing the increase of an overhead.

The above objects are also achieved by permitting the elimination of a shadow translation table which is a combination of address translation tables of the level-1 OS and the level-2 OS by means which does not use the address translation table in the address translation of the level-1 OS, in order to reduce the overhead in the preparation and maintenance of the shadow translation table.

As shown in FIG. 4, a level-1 OS is structured in a real machine, and a level-2 OS is structural under the control thereof, and a level-3 OS is further structured and the control thereof.

Referring to FIG. 6, an outline of the address translation process of the present invention is explained.

A level-3 virtual address is translated by an address translation table generated by the level-3 OS so that a level-3 real address is generated.

The level-3 real address is then prefix-translated by a prefix value prepared by the level-3 OS to generate a level-3 absolute address.

The prefix translation function is now explained with reference to FIG. 5. The prefix translation function is described in the above-mentioned publication. When an address of an information processing system in accessing a main storage designates a specific area, the prefix translation function translates the main storage address to be accessed by using a predetermined prefix value.

In a most common prefix translation function, assuming that $\alpha$ is assigned as the prefix value and the information processing system is to access addresses 0–4095 of the main storage, the addresses are translated so that addresses $\alpha+(0-4095)$ are accessed. Further, when the information processing system is to access the addresses $\alpha+(0-4095)$ of the main storage, the addresses are translated so that the addresses 0–4095 are accessed. The address prior to the prefix translation is called a real address, and the address after the translation is called an absolute address.

A value at a start point A of the main storage is further added to the level-3 absolute address to produce a level-2 virtual address.

The level-2 virtual address is then address-translated by using an address translation table prepared by the level-2 OS to produce a level-2 real address, which is then prefix-translated by a prefix value prepared by the level-2 OS to produce a level-2 absolute address.

The level-2 absolute address is then address-translated by the level-1 OS. This address translation is one which merely adds a value at a start point B of the main storage to the level-2 absolute address. Namely, the level-2 absolute address is the level-1 virtual address, and the level-1 virtual address is translated to the level-1 absolute address by adding the value at the start point B of the main storage without using the address translation table.

The generated absolute address is checked as to whether it is within the specified extent of the main storage, when the value at the start point of the main storage is added in the course of the address translation. The check is done to prevent the accessing to an incorrect real main storage area when the address translation table of the virtual machine has an error.

In accordance with the present invention, two or more start points of the main storage are used in separate address translation processes, and the address translation table is not used in the level-1 OS. Accordingly, it is not necessary to prepare the shadow translation table, and the number of times of accessing to the address translation table in the address translation process is suppressed to the same level as that of the two-step address translation in spite of the use of the three-step address translation.

BRIEF DESCRIPTION OF THE DRAWINGS

FIGS. 10A to 10C illustrate detail of the address translation process of the present invention shown in FIG. 9, and FIGS. 11A to 11F show diagrams for explaining FIG. 9 and FIGS. 10A to 10C.

DESCRIPTION OF THE PREFERRED EMBODIMENTS

Figure 1:
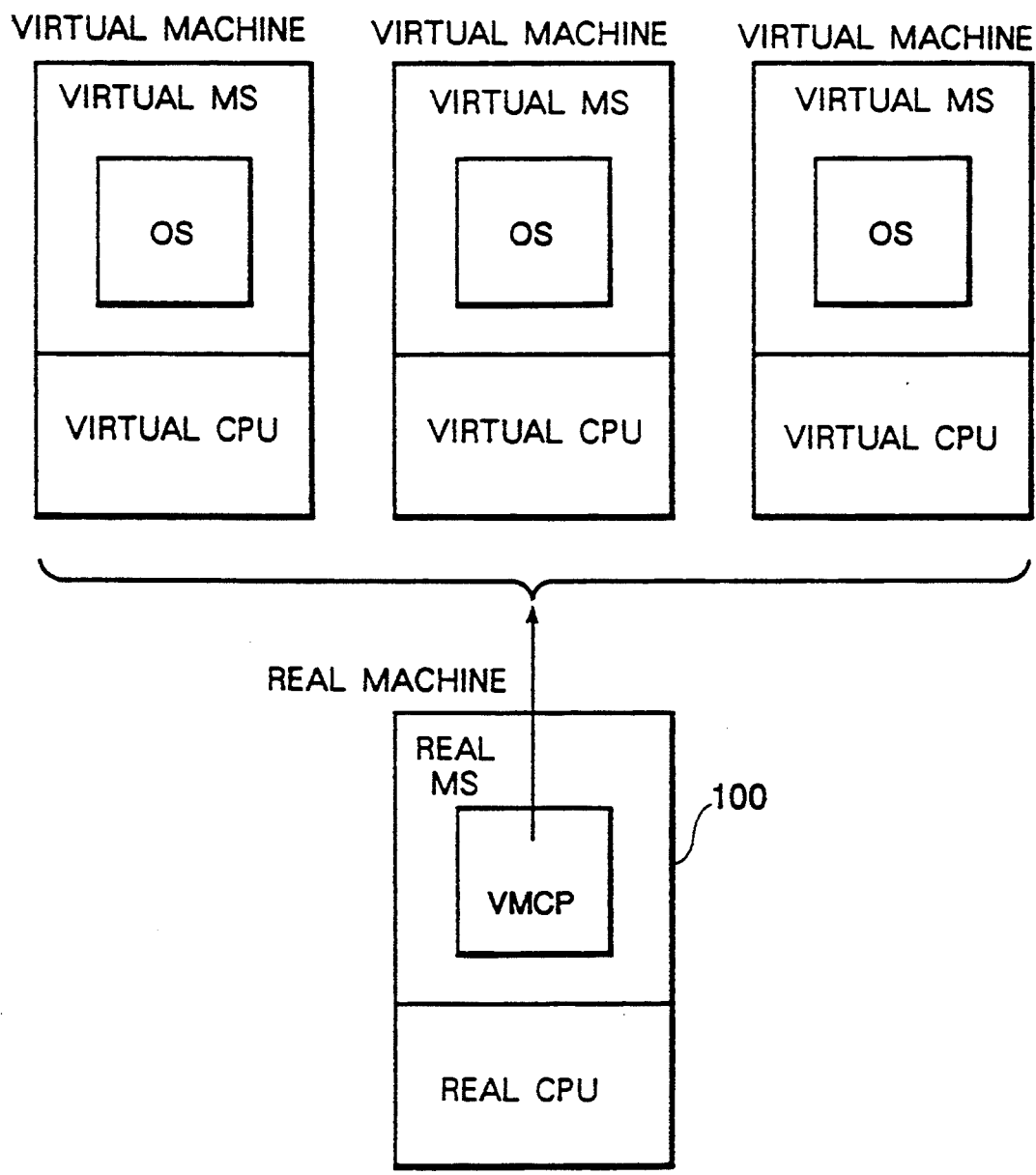
FIG. 1 shows a relation between a real machine and a virtual machine.
Figure 2:
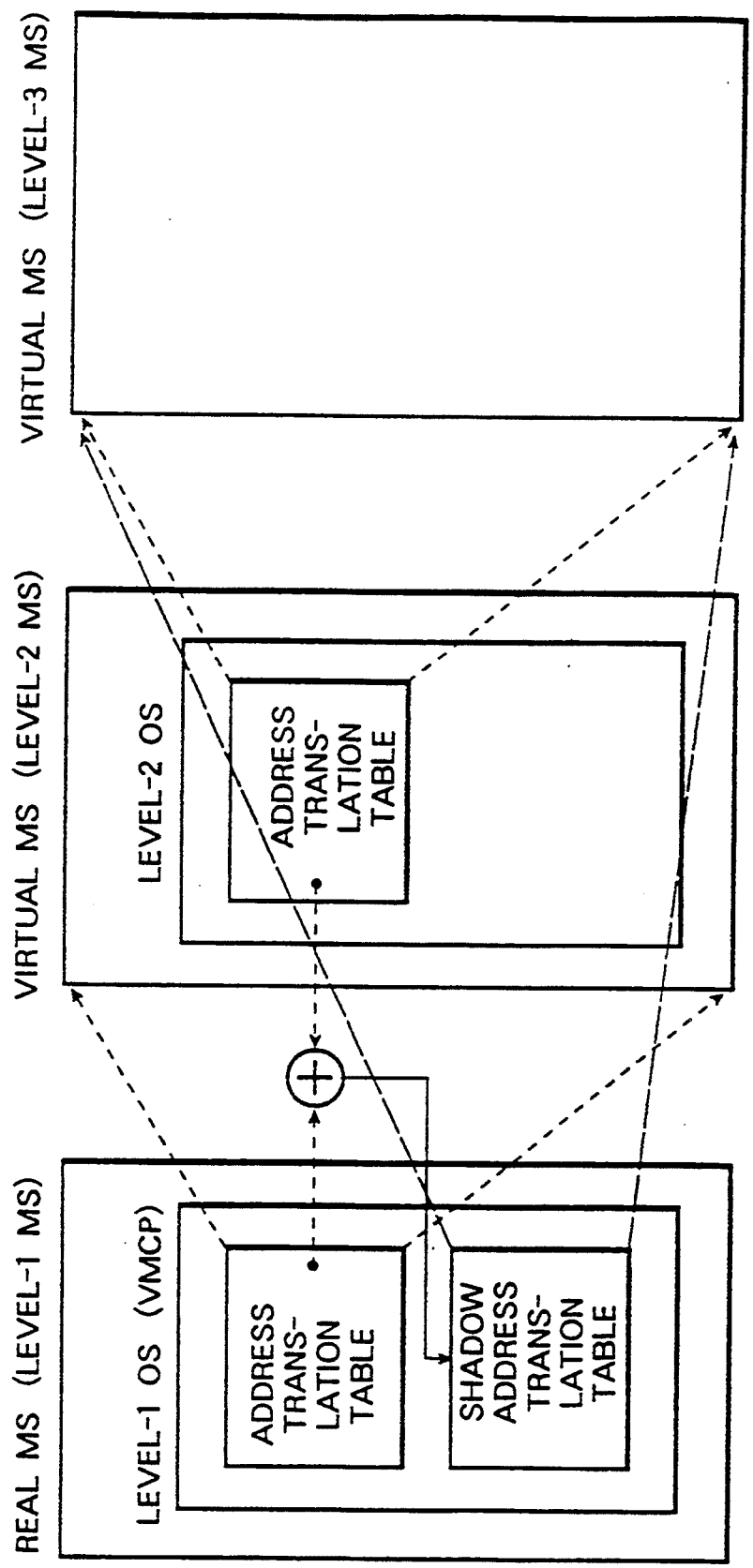
FIG. 2 illustrates one-step address translation in a virtual machine.
Figure 3:
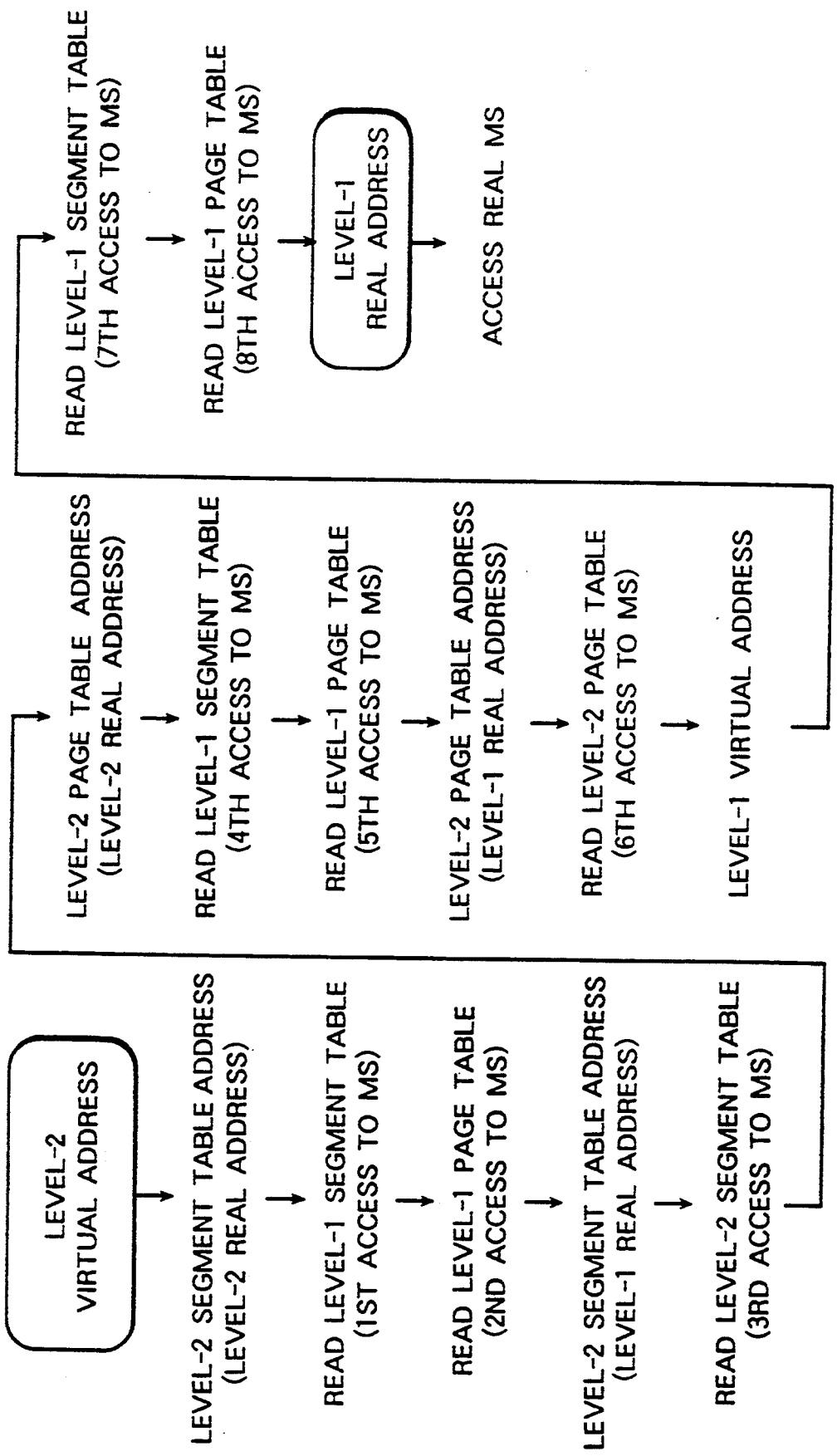
FIG. 3 shows a flow chart for illustrating a one-step address translation process in the virtual machine.
Figure 4:
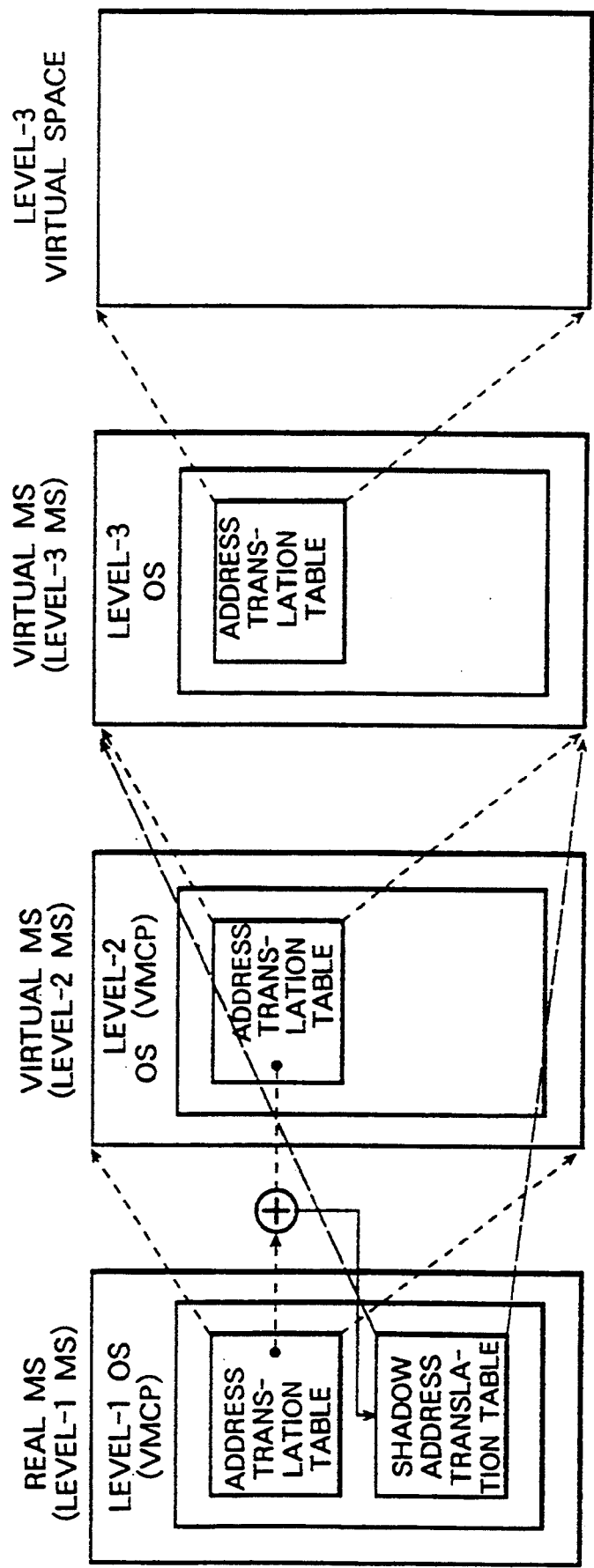
FIG. 4 illustrates two-step address translation in the virtual machine.
Figure 5:
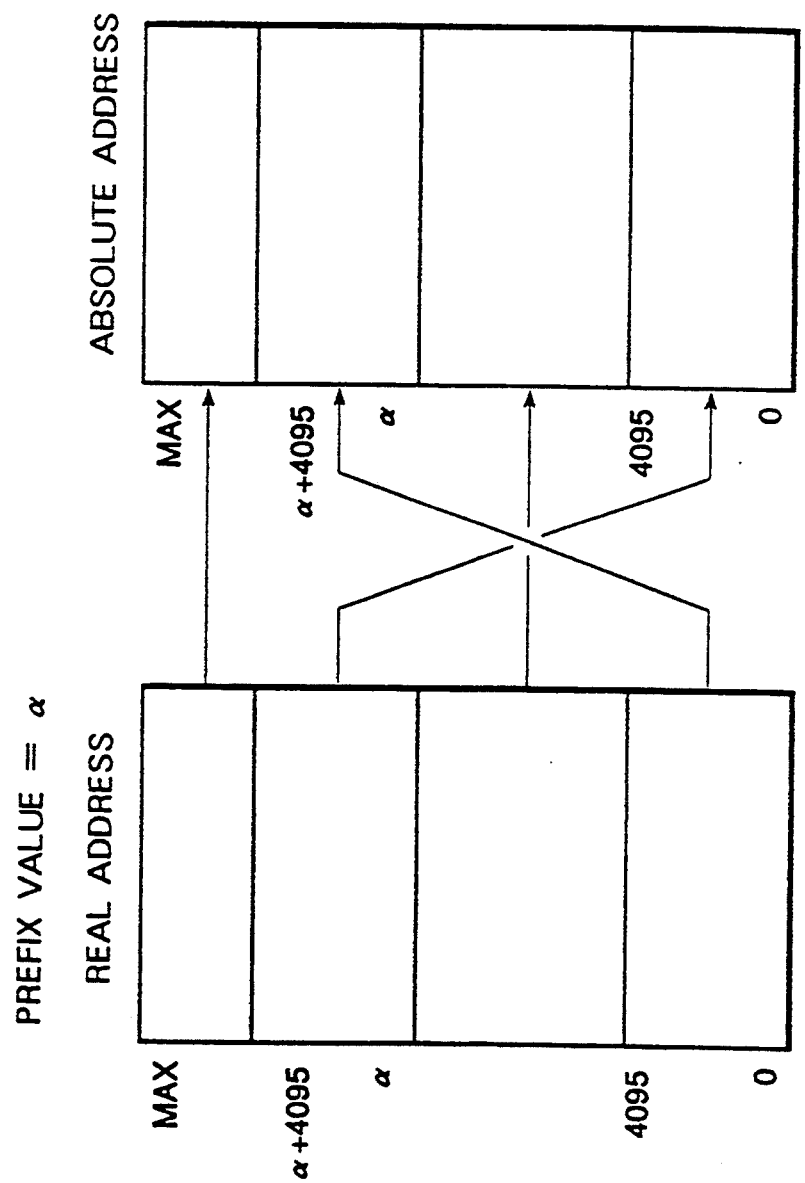
FIG. 5 illustrates prefix translation.
Figure 6:
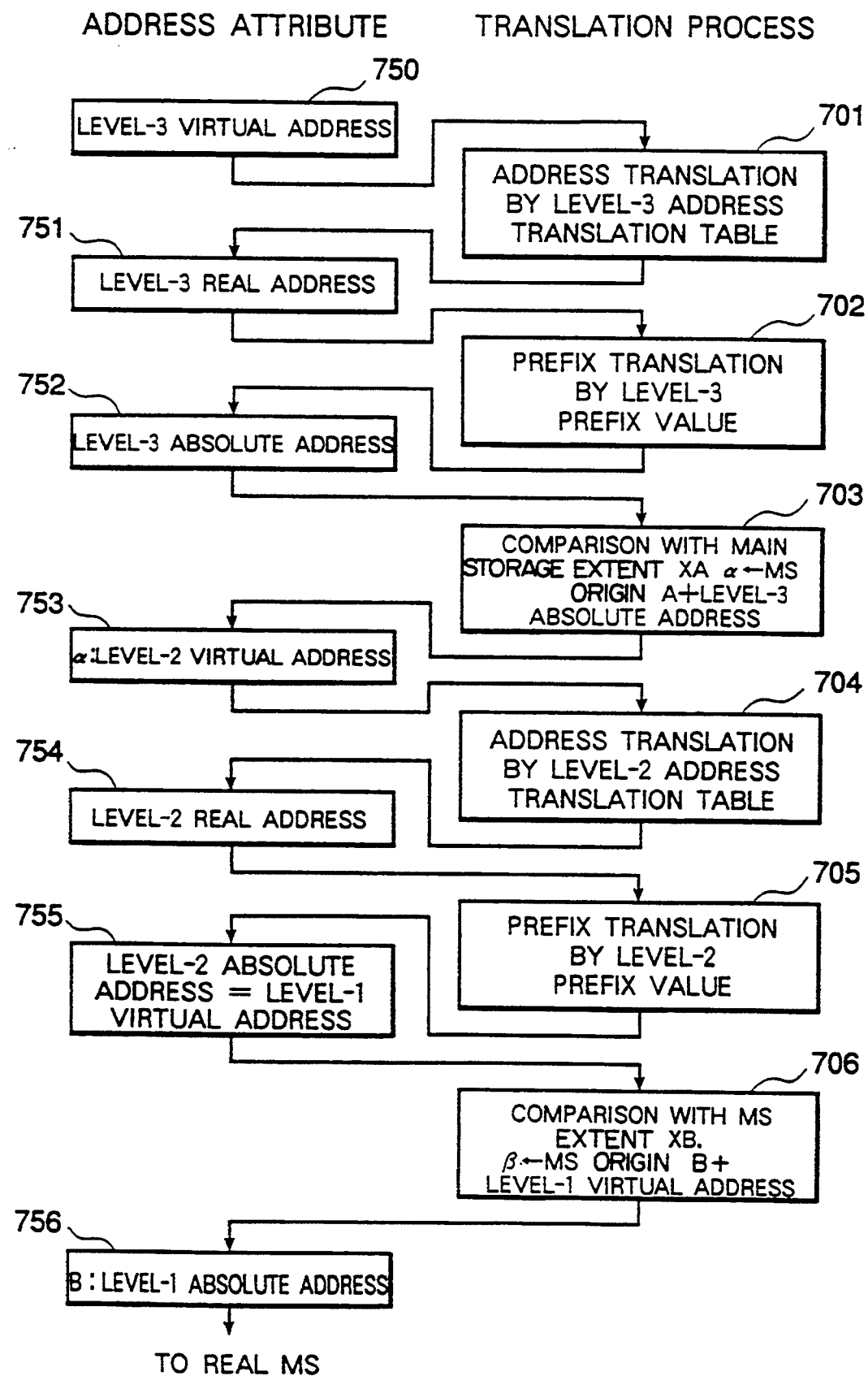
FIG. 6 shows a flow chart for illustrating an outline of an address translation process of the present invention.
Figure 7:
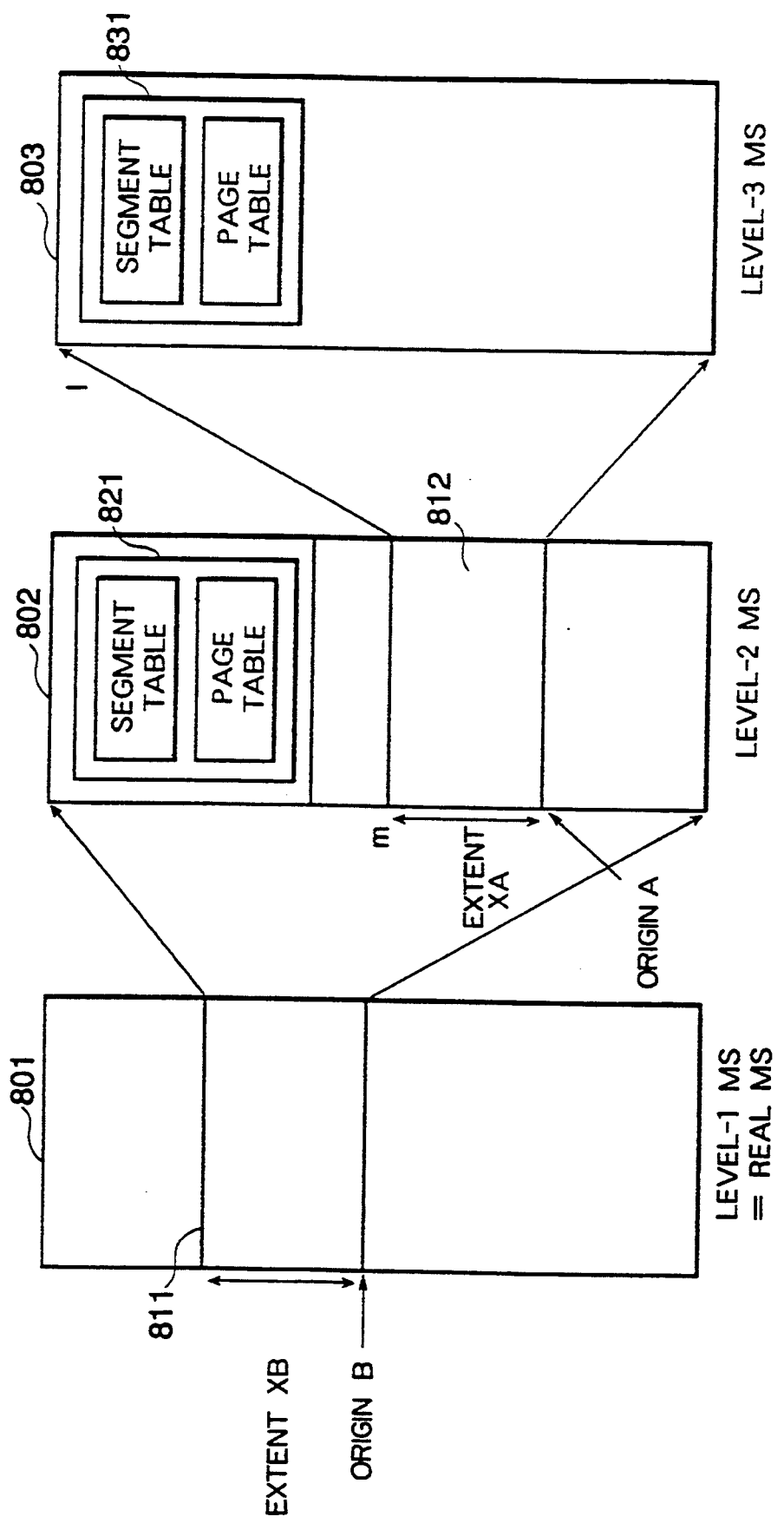
FIG. 7 shows a mutual relation of main storages of respective levels in one embodiment of the present invention.

FIG. 6 shows a flow chart for illustrating an address translation process, and FIG. 7 shows a mutual relation of main storages in respective levels in one embodiment of the present invention. In FIGS. 6 and 7, numerals 701 to 707 denote address translation processes, and numerals 801 to 803 denote main storages of levels 1 to 3.

In FIG. 7 which shows the mutual relation of the main storages of the respective levels in the virtual machine system, a main storage 801 of a level-1 is a real main storage on the real machine, and a main storage 802 of a level-2 starts from an address which is a sum of a low order address of the main storage of the level-1 (address 0 of the main storage 802 in FIG. 7) and has a main storage extent XB. Thus, a main storage area 811 of the main storage 801 of the level-1 is treated as the main storage 802 of the level-2.

The main storage 802 of the level-2 has an address translation table 821 to generate a virtual address space 812 of the level-2. A main storage 803 of the level-3 starts from a virtual space address which is a sum of the virtual address of the level-2 generated by the address translation table 821 in the main storage of the level-2 and a main storage origin address A of the main storage 802 of the level-2, and has a main storage extent XA.

The main storage 801 of the level-1 can impart real main storages which are level-1 main storages to a plurality of level-2 guests by setting a plurality of sets of arbitrarily selected main storage origin B and main storage extent XB. In other words, it physically divides and allocates the real main storage resource to the level-2 virtual machines. Similarly, the virtual space resource of the level-2 virtual space can be logically divided and allocated to the level-3 virtual machines.

How the level-1 OS starts the level-2 OS and the level-3 OS is now explained with reference to FIGS. 8A and 8B.

In order for the level-1 OS to start the level-2 OS as the virtual machine, an instruction SIE which is an instruction to start the virtual machine is used. An operand address of the SIE instruction designates an area which stores status description (SD) which includes a field for storing the main storage origin B and a field for designating the main storage extent XB. The SIE instruction, the specification of the SD and the function thereof are described in the above-mentioned IBM publications and U.S. Pat. No. 4,792,895.

Figure 8:
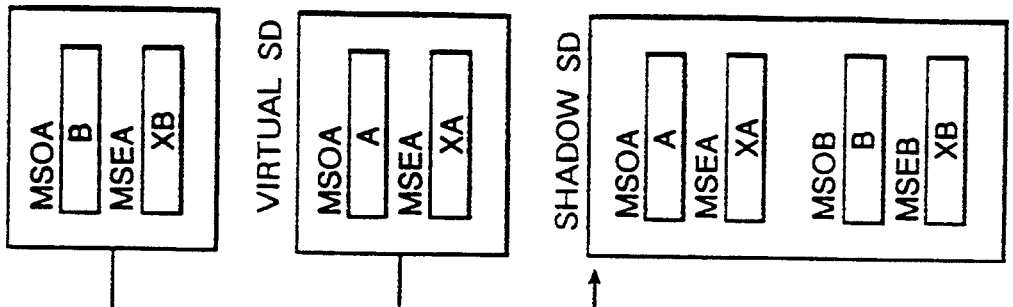
FIGS. 8A and 8B illustrate a process of a level-1 OS when a level-2 OS starts a level-3 OS.

In the virtual machine system, when the execution of instructions of the level-2 OS is started by the instruction SIE, the level-2 OS prepares SD (virtual SD) for starting the level-3 OS which is controlled under the level-2 OS and issues an SIE instruction (virtual SIE instruction (FIG. 8A).

Since the SIE instruction issued by the level-2 OS, that is, the virtual SIE instruction is intercepted by the level-1 OS because the level-2 OS itself does not manage the real hardware resource, and the control is returned to the level-1 OS.

The level-1 OS checks a cause of the interception, and if it is determined that the cause is the virtual SIE instruction issued by the level-2 OS, it simulates the virtual SIE. In the simulation, other SD (shadow SD) for starting the level-3 OS is prepared (FIGS. 8A and 8B) based on the virtual SD prepared by the level-2 OS and the allocation of the real hardware recognized by the level-1 OS itself, and the level-1 OS issues an SIE instruction having the shadow SD as an operand so that it appears as if the level-2 OS issued the SIE instruction by using the virtual SD.

A field for storing the main storage origin A in the virtual SD prepared by the level-2 OS and a field for designating the main storage extent XA are copied, as they are, into the shadow SD for executing the virtual SIE, and the shadow SD is used in a translation process from the level-3 absolute address to the level-2 virtual address. A field for storing the main storage origin B and a field for storing the main storage extent XB are stored into the shadow SD by the level-1 OS as the values of the real main storage allocated to the level-2 OS. Those values are used in the address translation process from the level-1 virtual address to the level-1 absolute address.

The value of the field for the main storage origin A used as a parameter of the address translation of the real hardware and the value of the field for the main storage extent XA have been known as the SIE function and the detailed specification thereof is described in the above-mentioned IBM publications.

In the embodiment of the present invention, the field for the main storage origin B and the field for the main storage extent XB, which are other parameters, are used as the SD information to attain a new function of determining a level-1 absolute address based on a level-1 virtual address.

Referring to the flow chart of FIG. 6, the address translation process in one embodiment of the present invention is explained.

(a) A level-3 virtual address 750 which addresses to the virtual space of the level-3 OS is translated to a level-3 real address 751 by using the address translation table prepared by the level-3 OS (step 701).

(b) The translated level-3 real address 751 is prefix-translated to a level-3 absolute address 752 by using a prefix value prepared by the level-3 OS (step 702).

(c) Whether the translated level-3 absolute address 752 is equal to or larger than the value of the main storage extent XA or not is determined. If it is equal or larger, it is reported to the level-3 OS by address designation violation program interruption, and if it is not larger than the value of the main storage extent XA, the main storage origin A designated by the shadow SD is added to the level-3 absolute address 752. In this manner, the level-2 virtual address 753 is produced (step 703).

(d) The level-2 virtual address 753 is address-translated to a level-2 real address 754 by using the address translation table prepared by the level-2 OS (step 704).

(e) The level-2 real address 754 determined in the step 704 is prefix-translated to a level-2 absolute address, that is, a level-1 virtual address 755 by using the prefix value prepared by the level-2 OS (step 706).

(f) The level-1 virtual address 755 is compared with the main storage extent XB designated by the shadow SD. If the level-3 virtual address 755 is equal to or larger than the main storage extent XB, it is reported to the level-2 OS by the address designation violation program interruption. Otherwise, the main storage origin B designated by the shadow SD is added to the level-3 virtual address 755 to produce a level-1 absolute address 756 (step 707).

The real main storage is accessed by the level-1 absolute address 756.

The level-1 absolute address 756 determined by the address translation is paired with the level-3 virtual address 750 and registered in the translation lookaside buffer (TLB) in the processor, together with a virtual machine ID of the level-3 OS. When the main storage accessing in the same page is to be done subsequently, the level-1 absolute address can be determined from the translation pair in the TLB without carrying out the above address translation.

In the present embodiment, the address translation process in a so-called pageable storage mode in which the VMCP which is the level-2 OS allocates the main storage of the level-3 OS to the virtual address space is described. Where the level-2 OS allocates a preferred storage mode to the allocation of the main storage of the level-3 OS, the level-3 absolute address 752 is treated as the level-1 virtual address 755 without any process.

The specifications and the functions of the pageable storage mode and the preferred storage mode are described in the above-mentioned publications.

Figure 9:
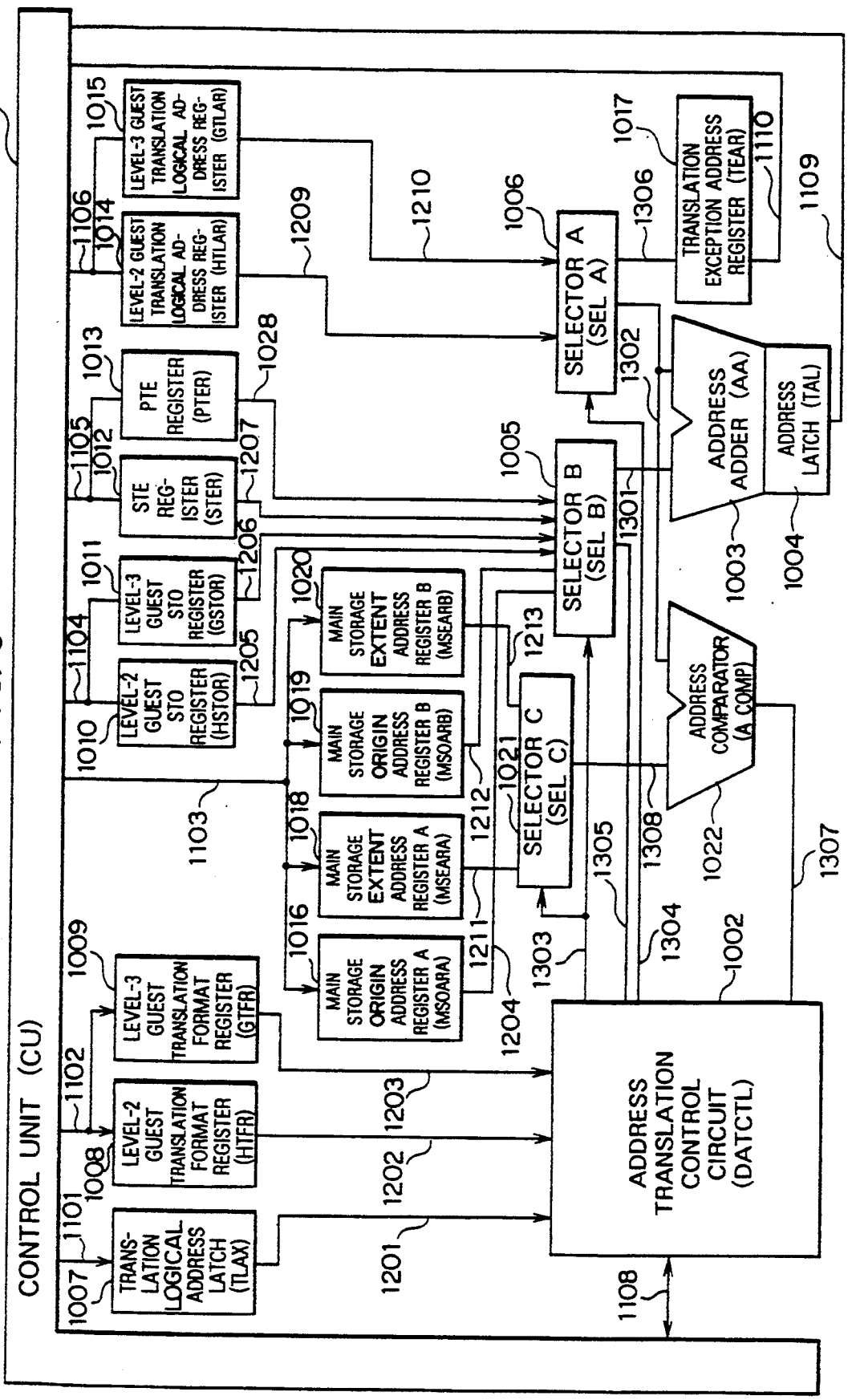
FIG. 9 shows a block diagram of one embodiment of the present invention.

FIG. 9 shows a block diagram of an address translation unit in the embodiment of the present invention.

In FIG. 9, numeral 1001 denotes a control unit (CU) which controls the setting of registers in the address translation unit and the transfer of data. Numeral 1002 denotes an address translation control circuit (DATCTL) which controls data transfers in an address translation execution stage and the address translation unit and the exchange of control with the CU 1001. Numeral 1003 denotes an address adder (AA) for effecting binary addition of two inputs. A sum of the AA 1003 is stored in a translation address latch (TAL) 1004. The data stored in the TAL 1004 is sent to the CU 1001 through a signal line 1109. Numeral 1005 denotes a selector (SELB) which selects one of six input signals to send it to a signal line 1301. Numeral 1021 denotes a selector (SELC) which selects one of two input signals to send it to an address comparator ACOMP 1022 through a line 1308. Numeral 1006 denotes a selector (SELA) which selects one of two input signals to send it to the address adder 1003 and the comparator 1022 through a line 1302.

Numeral 1007 denotes a translation logical address latch (TLAX) which latches an address to be translated and sends the latched content to the DATCTL 1002 through a signal line 1201. An address which is translated during the address translation as required is set from the CU 1001.

Numerals 1008 and 1009 denote translation format registers (HTFR and GTFR) which hold translation formats to be used in the address translation of a level-2 virtual machine (level-2 guest) and a level-3 virtual machine (level-3 guest), respectively. The data of the translation formats of the level-2 virtual machine and the level-3 virtual machine are set to the HTFR 1008 and the CTFR 1009, respectively, from the CU 1001 through a signal line 1102.

Numerals 1010 and 1011 denote segment table start point registers (HSTOR and GSTOR) which hold segment table origin and segment table lengths of the level-2 virtual machine and the level-3 virtual machine, respectively. Segment table designation data of the level-2 virtual machine and the level-3 virtual machine are set in the HSTOR 1010 and the GSTOR 1011, respectively, from the CU 1001.

Numeral 1012 denotes a segment table entry register (STER) which holds a segment table entry taken out in the course of the address translation, and numeral 1013 denotes a page table entry register (PTER) which holds a page table entry. Each of the STER 1012 and the PTER 1013 is used to hold the table entries of both the level-2 virtual machine and the level-3 virtual machine.

Numerals 1014 and 1015 denote translation logical address registers (HTLAR and GTLAR) which hold the virtual addresses to be translated, of the level-2 virtual machine and the level-3 virtual machine, respectively. The corresponding virtual addresses are set in the HTLAR 1014 and the GTLAR 1015 from the CU 1001 during the execution of the translation process.

Numeral 1016 denotes a main storage origin address register A (MSOARA) which holds a main storage origin address to define the start address of the main storage area of the level-3 virtual machine in the main storage of the level-2 virtual machine. The corresponding main storage origin address of the level-3 virtual machine is set in the MSOARA 1016 from the CU 1001 through a signal line 1103.

Numeral 1019 denotes a main storage origin address register B (HSOARB) which holds a main storage start address to define a origin address of the main storage area of the level-2 virtual machine in the main storage of the level-1 real machine. The corresponding main storage origin address of the level-2 virtual machine is set in the MSOARB 1019 from the CU 1001 through the signal line 1103.

Numeral 1017 denotes a translation exception address register (TEAR) which sets and holds a virtual address at which an exception for the address translation has taken place during the address translation process. Numeral 1018 denotes a main storage extent register A (MSEARA) which holds a main storage area address to define the main storage extent of the level-3 virtual machine. The corresponding main storage extent address of the level-3 virtual machine is set in the MSEARA 1018 by the CU 1001 through the signal line 1003.

Numeral 1020 denotes a main storage extent address register B (MSEARB) which holds a main storage area address to define the main storage extent of the level-2 virtual machine. The corresponding main storage extent address is set in the MSEARB 1020 by the CU 1001 through the signal line 1003.

The outputs of the registers 1018 and 1020 are applied to the selector.

Figure 10C:
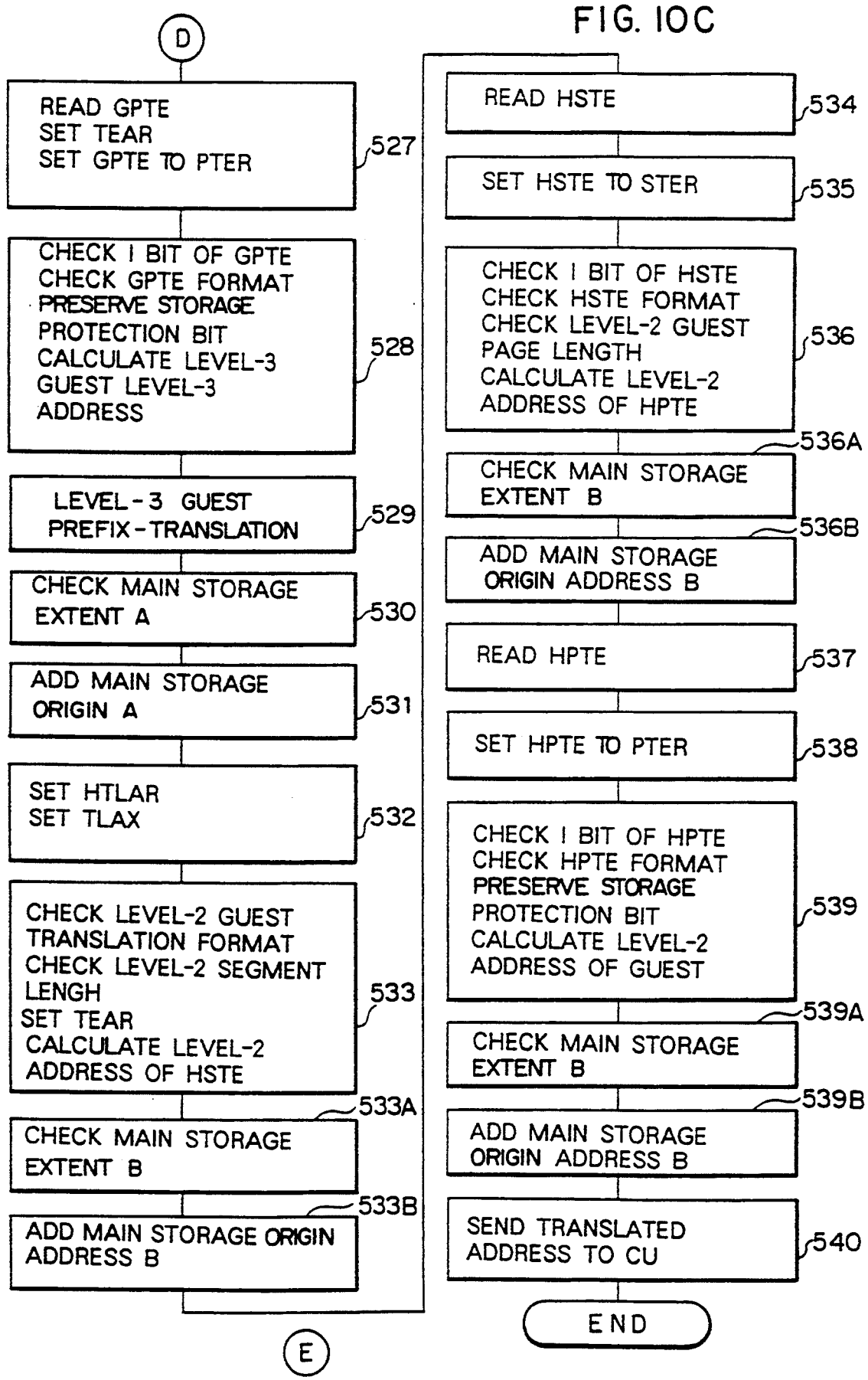

FIGS. 10A to 10C show flow charts for explaining the operation of FIG. 9, and FIGS. 11A to 11F diagramatically show the operation. The numbers in the circles correspond to the process steps in FIGS. 10A to 10C. The operation of FIG. 9 is now explained in accordance with the process of FIGS. 10A to 10C.

Figure 11A:
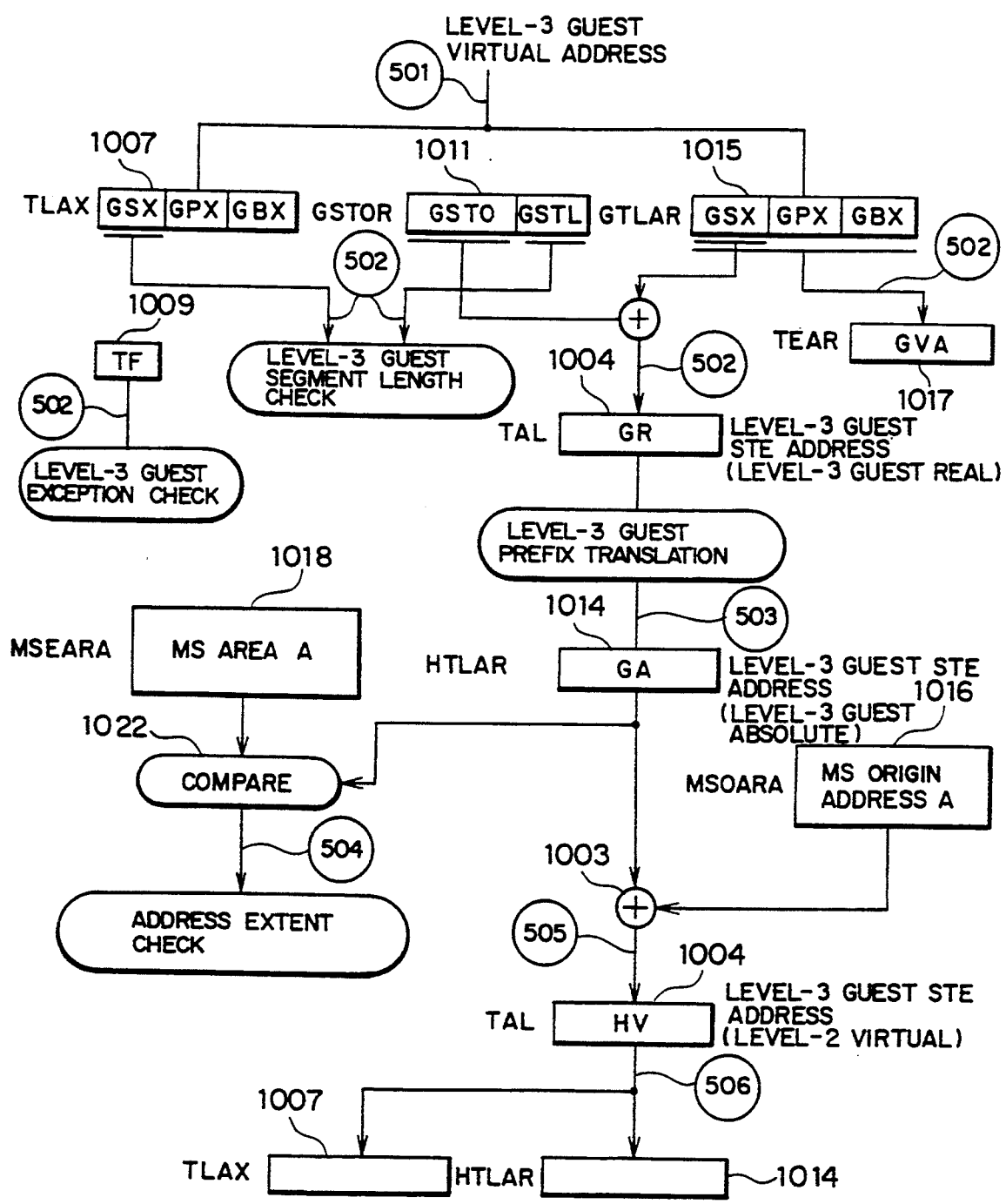

Steps 501 to 506 are first explained (FIG. 11A).

Step 501

The CU 1001 sets the virtual address of the level-3 virtual machine (guest) which is to be translated into the GTLAR 1015 and the TLAX 1007 of the address translation unit, through the signal lines 1106 and 1101, respectively, and sends a start of address translation request trigger to the ATCTL 1002 of FIG. 9 through the signal line 1108. Thus, the same virtual address is set in the GTLAR 1015 and the TLAX 1007.

In the following description, it is assumed that the both address translation mode bits of the program status words (PSW) of the level-2 guest and the level-3 guest are "1" that is both the level-2 guest and the level-3 guest need the address translation.

Step 502

In response to the start of address translation trigger, the DATCTL 1002 checks the format of the guest translation format data held in the GTFR 1009. If the format is not proper, it is reported to the CU 1001 through the signal line 1008 to stop the subsequent address translation operation.

The level-3 guest translation format data held in the GTFR 1009 defines the segment size and the page size of the level-3 guest address translation architecture. For example, according to the IBM publications, "IBM System 370 Principles of Operation" (GA-22-7000) and "IBM System 370 Extended Architecture Principles of Operation" (SA-22-7085), the value is $(01000)_2$ for the segment size of 64K bytes and the page size of 2K bytes, $(010010)_2$ for the segment size of 1M butes and the page size of 2K bytes, $(10000)_2$ for the segment size of 64K bytes and the page size of 4K bytes, and $(10010)_2$ or $(10110)_2$ for the segment size of 1M bytes and the page size of 4K bytes.

The DATCLT 1002 issues a command to supply the level-3 guest segment table designation data held in the GSTOR 1011 to the signal line 1305, to the SELB 1005 through the signal line 1303, and compares the segment field (SX) of the level-3 guest virtual address (GVA) sent from the TLAX 1007 through the signal line 1201 and the segment table length in the segment table designation data supplied through the signal line 1305, and if the level-3 guest SX is larger, it is reported to the CU 1001 through the signal line 1108 to stop the subsequent address translation operation.

The DATCLT 1002 also issues a command to set the GVA held in the GTLAR 1015 into the TEAR 1017 through the signal line 1306, to the SELA 1006 through the signal line 1304, issues a command to extract only the segment table start address data of the content of the GSTOR 1011 sent to the signal line 1206 and send it to the signal line 1301, to the SELB 1005 through the signal line 1303, and issues a command to extract the field SX of the GCA held in the GTLAR 1015 sent to the signal line 1210, shift it and insert "0" thereto in accordance with the level-3 guest address translation architecture, and send it to the signal line 1302, to the SELA 1006 through the signal line 1304.

The address calculator 1003 shown in FIG. 12A adds the level-3 guest segment table origin address (GSTO) and the level-3 guest SX (GSX) sent to the signal lines 1301 and 1302, respectively, and sets the sum into the TAL 1004. The content of the TAL 1004 is the level-3 real address (GR) of the level-3 guest segment table entry (GSTE) and it is sent to the CU 1001 through the signal line 1109.

Step 503

The CU 1001 prefix-translates the level-3 real address (GR) of the GSTE sent through the signal line 1109 by using the level-3 guest prefix value, and sets it into the HTLAR 1014 through the signal line 1106. The address set in the HTLAR 1014 is the leve-3 absolute address (GA) of the GSTE.

Step 504

The DATCTL 1002 issues a command to select and send the main storage extent address A which is the content of the MSEARA 1018 sent to the signal line 1211 to the signal line 1308, to the SELC 1021 through the signal line 1303, and also issues a command to select and send the level-3 absolute address of the GSTE which is the content of the HTLAR 1014 sent to the signal line 1209 to the signal line 1302, to the SELA 1006 through-the signal line 1304. The ACOMP 1022 compares the main storage extent address A and the level-3 absolute address of the GSTE sent to the signal lines 1308 and 1302, respectively. When the level-3 absolute address of the GSTE is larger than the main storage extent address A, the ACOMP 1022 reports it (by providing "1" signal) to the DATCTL 1002 through the signal line 1307. When the DATCTL 1002 receives the report signal, it reports it to the CU 1001 through the signal line 1108 to stop the subsequent address translation operation.

Step 505

When the level-3 absolute address of the GSTE is within the main storage extent address A, the DATCLT 1002 issues to the SELB 1005 and the SELA 1006 through the signal lines 1303 and 1304, respectively, a command to select and send to the signal line 1301 the main storage origin address which is the content of the MSOARA 1016 sent to the signal line 1204 and a command to select and send to the signal line 1302 the level-3 absolute address (GA) of the GSTE which is the content of the HTLAR 1014 sent to the signal line 1209. The line 1302 is applied to the comparator 1022 together with the output 1308 of the selector C 1021.

The AA 1003 adds the main storage origin address and the level-3 absolute address of the GSTE sent to the signal lines 1301 and 1302, respectively, and sets the sum into the TAL 1004. The address set in the TAL 1004 is the level-2 virtual address of the GSTE and it is equal to the level-2 real address of the GSTE when the address translation node bit of the PSW of the level-2 guest is "0". When it is "0", the process proceeds to a step 514. In the present example, it is assumed that the bit is "1".

The level-2 virtual address of the GSTE set in the TAL 1004 is sent to the CU 1001 through the signal line 1109.

Step 506

The CU 1001 sets the level-2 virtual address of the GSTE sent through the signal line 1109 into the HTLAR 1014 through the signal line 1106 and sets it into the TLAX 1007 through the signal line 1101.

Figure 11B:
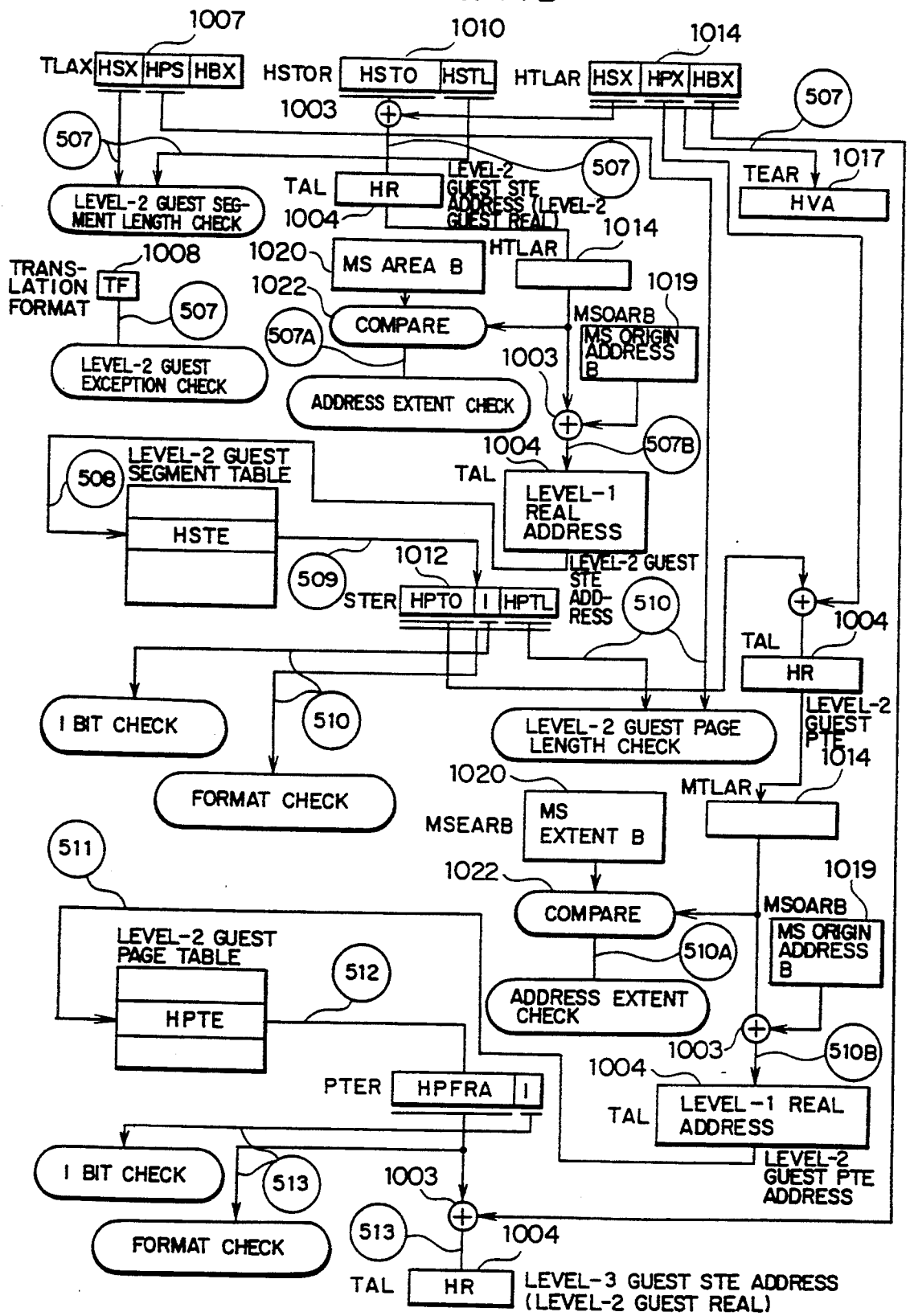

The process of steps 507 to 513 is now explained (FIG. 11B).

Step 507

The DATCTL 1002 checks the level-2 guest translation format data held in the HTFR 1008 in accordance with the level-2 guest address translation architecture, and if it is not a proper format, it reports it to the CU 1001 through the signal line 1108 to stop the subsequent address translation operation.

The DATCTL 1002 also issues to the SELB 1005 through the signal line 1303 a command to send the level-2 guest segment table designation data held in the HSTOR 1010 to the signal line 1305, and compares the segment table length in the segment table designation data sent through the signal line 1305 and the SX of the level-2 guest virtual address (HVA) sent from the TLAX 1007 through the signal line 1201 in accordance with the level-2 guest address translation architecture. If the level-2 guest SX is larger, it reports it to the CU 1001 through the signal line 1108 to stop the subsequent address translation operation.

The DATCTL 1002 also issues to the SELA 1006 through the signal line 1304 a command to set the HVA held in the HTLAR 1014 into the TEAR 1017 through the signal line 1306, and issues to the SELB 1005 through the signal line 1303 a command to extract and send to the signal line 1301 only the segment table origin address data (HSTO) of the content of the HSTOR 1010 sent to the signal line 1205, and further issues to the SELA 1006 through the signal line 1304 a command to extract the SX of the HVA which is the content of the HTLAR 1014 sent to the signal line 1209, shift it and insert "0" therein in accordance with the level-2 guest address translation architecture and send it to the signal line 1302.

The AA 1003 adds the level-2 segment table origin address (HSTO) and the SX field of the HVA sent through the signal lines 1301 and 1302, respectively, and sets the sum into the TAL 1004. The address set in the TAL 1004 is the level-2 real address (HR) of the level-2 guest segment table entry (HSTE) and it is sent to the CU 1001 through the signal line 1109.

Step 507A

The DATCTL 1002 of FIG. 10 issues to the SELC 1021 through the signal line 1303 a command to select and send to the signal line 1308 the main storage extent address B which is the content of the MSEARB 1020 sent through the signal line 1213, and issues to the SELA 1006 through the signal line 1304 a command to select and send to the signal line 1302 the level-2 absolute address (=level-1 virtual address) of the HSTE which is the content of the HTLAR 1014 sent through the signal line 1209. The ACOMP 1022 compares the main storage extent address B and the level-2 absolute address of the HSTE sent through the signal lines 1308 and 1302, respectively, and reports whether the level-2 absolute address of the HSTE is larger than the main storage extent address B or not to the DATCTL 1002 through the signal line 1307. When the DATCTL 1002 receives the report signal, it reports it to the CU 1001 through the signal line 1108 to stop the subsequent address translation operation.

Step 507B

When the level-2 absolute address of the HSTE is within the main storage extent address B, the DATCTL 1002 issues to the SELB 1005 and the SELA 1006 through the signal lines 1303 and 1304, respectively, a command to select and send to the signal line 1301 the main storage origin address B which is the content of the MSOARB 1019 sent through the signal line 1212 and a command to select and send to the signal line 1302 the level-2 absolute address of the HSTE which is the content of the HTLAR 1014 sent through the signal line 1209, respectively.

The AA 1003 adds the main storage origin address B and the level-2 absolute address (=level-1 virtual address) of the HSTE sent through the signal lines 1301 and 1302, respectively, and sets the sum into the TAL 1004. The address set in the TAL 1004 is the level-1 real address of the HSTE, and it is sent to the CU 1001 through the signal line 1109.

Step 508

The CU 1001 issues a read request for the HSTE to the main storage by using the level-1 real address of the HSTE sent through the signal line 1109.

Step 509

The CU 1001 sets the HSTE read from the main storage into the STER 1012 through the signal line 1105 and reports it to the DATCTL 1002 through the signal line 1008.

Step 510

When the DATCTL 1002 receives the report of the completion of execution of the step 509 through the signal line 1108, it determines whether the HSTE invalid bit (I bit) is "1" or not. If the invalid bit is "1", it reports it to the CU 1001 through the signal line 1108 to stop the subsequent address translation operation.

The DATCTL 1002 also issues through the signal line 1303 a command to send the content of the STER 1012 to the DATCTL 1002 through the signal line 1305 and checks the format of the HSTE in accordance with the level-2 guest address translation architecture, and if a format violation is detected, it reports it to the CU 1001 through the signal line 1008 to stop the subsequent address translation operation.

The DATCTL 1002 issues to the SELB 1005 through the signal line 1303 a command to send the content of the HSTE held in the STER 1012 to the signal line 1305, and compares the page table length of the HSTE sent through the signal line 1305 and the PX field of the level-2 guest virtual address sent from the TLAX 1007 through the signal line 1201 in accordance with the level-2 guest address translation architecture, and if the level-2 guest PX is larger, it reports it to the CU 1001 through the signal line 1108 to stop the subsequent address translation operation.

The DATCTL 1002 also issues to the SELB 1005 through the signal line 1303 a command to extract only the page table origin address data (HPTO) of the content of the STER 1012 sent through the signal line 1207 and send it to the signal line 1301, and issues to the SELA 1006 through the signal line 1304 a command to extract the PX field (HPX) of the HVA which is the content of the HTLAR 1014 sent through the signal line 1209, shift it and insert "0" therein in accordance with the level-2 guest address translation architecture and send it to the signal line 1302.

The AA 1003 adds the level-2 guest page table origin address (HPTO) and the PX field (HPX) of the HVA sent through the signal lines 1301 and 1302, respectively, and sets the sum into the TAL 1004. The address set in the TAL 1004 is the level-2 real address (HR) of the level-2 guest page table entry (HPTE), and it is sent to the CU 1001 through the signal line 1109.

Step 510A

The DATCTL 1002 issues to the SELC 1021 through the signal line 1303 a command to select and send to the signal line 1308 the main storage extent address B which is the content of the MSEARB 1020 sent through the signal line 1213, and issues to the SELA 1006 through the signal line 1304 a command to select and send to the signal line 1302 the level-2 absolute address (=level-1 virtual address) of the HPTE which is the content of the HTLAR 1014 sent through the signal line 1209. The ACOMP 1022 compares the main storage extent address B and the level-2 absolute address of the HPTE sent through the signal lines 1308 and 1302, respectively, and reports whether the level-2 absolute address of the HPTE is larger than the main storage extent address B or not to the DATCTL 1002 through the signal line 1307. When the DATCTL 1002 receives the report signal, it reports it to the CU 1001 through the signal line 1108 to stop the subsequent address translation operation.

Step 510B

When the level-2 absolute address of the HPTE is within the main storage extent address B, the DATCTL 1002 issues to the SELB 1005 and the SELA 1006 through the signal lines 1303 and 1304, respectively, a command to select and send to the signal line 1301 the main storage origin address B which is the content of the MSOARB 1019 sent through the signal line 1212, and a command to select and send to the signal line 1302 the level-2 absolute address of the HPTE which is the content of the HTLAR 1014 sent through the signal line 1209, respectively.

The AA 1003 adds the main storage origin address B and the level-2 absolute address of the HPTE sent through the signal lines 1301 and 1302, respectively, and sets the sum into the TAL 1004. The address set in the TAL 1004 is the level-1 real address of the HPTE, and it is sent to the CU 1001 through the signal line 1109.

Step 511

The CU 1001 issues a read request for the HPTE to the main storage by using the level-1 real address of the HPTE sent through the signal line 1109.

Step 512

The CU 1001 sets the HPTE read from the main storage into the PTER 1013 through the signal line 1105 and reports it to the DATCTL 1002 through the signal line 1108.

Step 513

When the DATCTL 1002 receives the report of completion of the execution of the step 512 through the signal line 1108, it determines if the invalid bit (I bit) of the HPTE is "1" or not in accordance with the level-2 guest address translation architecture, and if the invalid bit is "1", it reports it to the CU 1001 through the signal line 1108 to stop the subsequent address translation operation.

The DATCTL 1002 also issues through the signal line 1303 a command to send the content of the PTER 1013 to the DATCTL 1002 through the signal line 1305, and check the format of the HPTE in accordance with the level-2 guest address translation architecture, and if a format violation is detected, it reports it to the CU 1001 through the signal line 1108 to stop the subsequent address translation operation.

The DATCTL 1002 also issues to the SELB 1005 through the signal line 1303 a command to edit only the page frame real address (PFRA) of the content of the PTER 1013 sent through the signal line 1208 in accordance with the level-2 guest address translation architecture and send it to the signal line 1301, and issues to the SELA 1006 through the signal line 1304 a command to extract the BX field (HBX) of the HVA sent through the signal line 1209, shift it and insert "0" therein in accordance with the level-2 guest address translation architecture and send it to the signal line 1302.

In the step 510 or 513, a storage protection bit of the address translation table is preserved by the DATCTL 1002 in accordance with the corresponding architecture.

The AA 1003 adds the level-2 guest PFRA (HPFRA) and the BX field (HBX) of the HVA sent through the signal lines 1301 and 1302, respectively, and sets the sum into the TAL 1004. The address set in the TAL 1004 is the level-2 real address (HR) of the level-3 guest segment table entry (GSTE), and it is sent to the CU 1001 through the signal line 1109.

Step 513A

The DATCTL issues to the SELC 1021 through the signal line 1303 a command to select and send to the signal line 1308 the main storage extent address B which is the content of the MSEARB 1020 sent through the signal line 1213, and issues to the SELA 1006 through the signal line 1304 a command to select and send to the signal line 1302 the level-2 absolute address of the GSTE (=level-1 virtual address) sent through the signal line 1209. The ACOMP 1022 compares the main storage extent address B and the level-2 absolute address of the GSTE sent through the signal lines 1308 and 1302, respectively, and reports to the DATCTL 1002 through the signal line 1307 whether the level-2 absolute address of the GSTE is larger than the main storage extent address B. When the DATCTL 1002 receives the report signal, it reports it to the CU 1001 through the signal line 1108 to stop the subsequent address translation operation.

Step 513B

When the level-2 absolute address of the GSTE is within the main storage extent address B, the DATCTL issues to the SELB 1005 and the SELA 1006 through the signal lines 1303 and 1304, respectively, a command to select and send to the signal line 1301 the main storage origin address B which is the content of the MSOARB 1019 sent through the signal line 1212 and a command to select and send to the signal line 1302 the level-2 absolute address of the GSTE which is the content of the HTLAR 1014 sent through the signal line 1209, respectively.

The AA 1003 adds the main storage origin address B and the level-2 absolute address of the GSTE sent through the signal lines 1301 and 1302, respectively, and sets the sum into the TAL 1004. The address set in the TAL 1004 is the level-1 real address of the GSTE. It is sent to the CU 1001 through the signal line 1109.

Figure 11C:
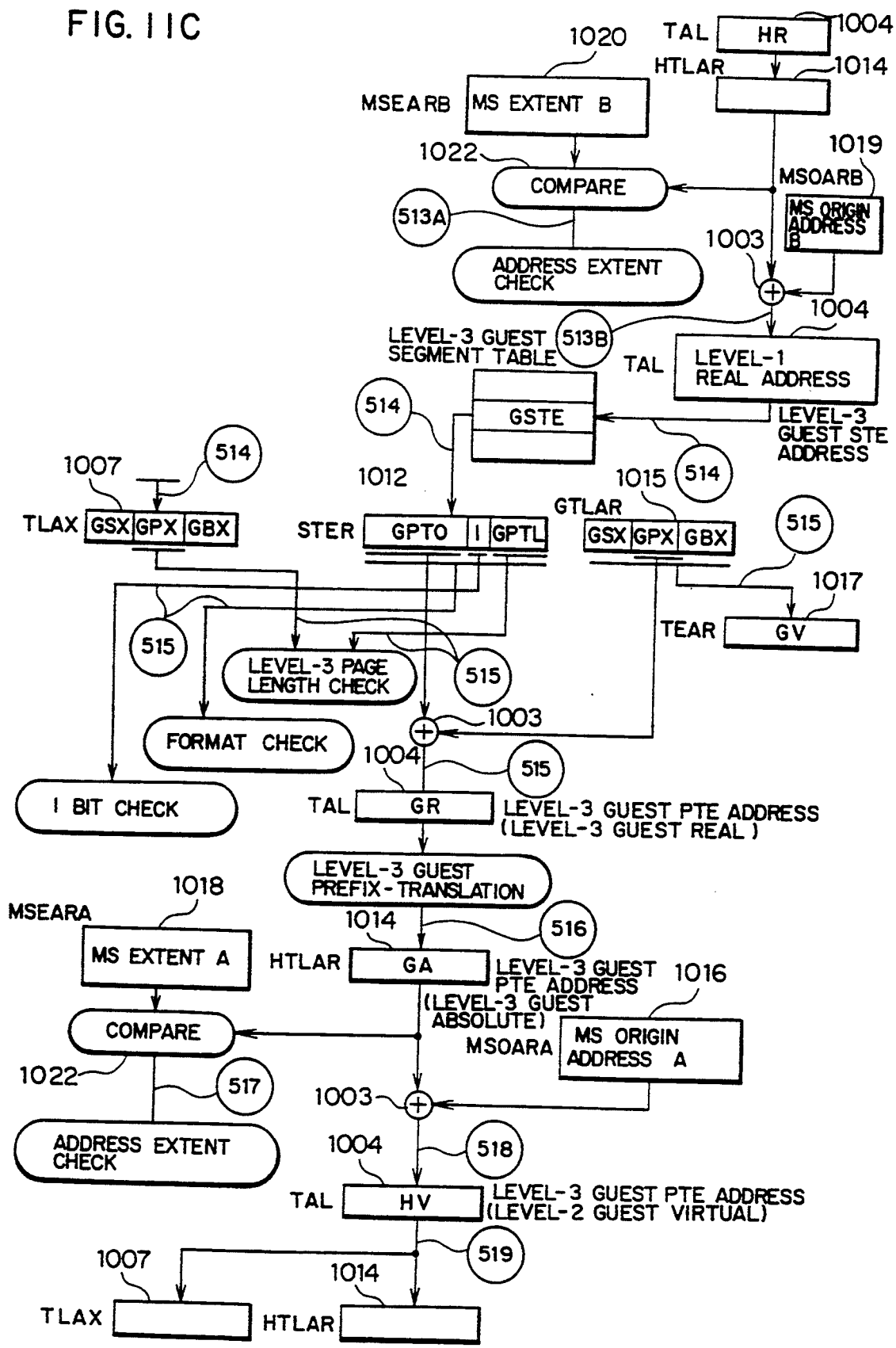

The process in the steps 514 to 519 is now explained (FIG. 11C).

Step 514

The CU 1001 issues to the SELA 1006 through the signal line 1304 a command to send the content of the GTLAR 1015 and set it into the TEAR 1017. The CU 1001 also sets the GVA into the TLAX 1007 through the signal line 1101. It further sets the GSTE into the STER 1012 and reports it to the signal line 1108 through the DATCTL 1002.

Step 515

When the DATCTL 1002 receives the report of the completion of the execution of the step 514 through the signal line 1108, it examines whether the GSTE invalid bit is "1" or not based on the level-3 guest address translation architecture, and if it is "1", the DATCTL 1002 reports it to the CU 1001 through the signal line 1108 to stop the subsequent address translation operation.

The DATCTL 1002 also sends to the SELB 1005 through the signal line 1303 a command to send the content of the STER 1012 to the signal line 1305 to check the format of the GSTE in accordance with the level-3 guest address translation architecture. If the format is invalid, the DATCTL 1002 reports it to the CU 1001 through the signal line 1108 to stop the subsequent address translation operation.

The DATCTL 1002 also preserve the common segment bit or the storage protection bit of the GSTE in the DATCTL 1002 by the corresponding architecture.

The DATCTL 1002 further issues to the SELB 1005 through the signal line 1303 a command to send the content of the GSTE saved in the STER 1012 to the signal line 1305, compares the page table length (GPTL) of the GSTE sent through the signal line 1305 and the PX field (GPX) of the level-3 guest virtual address sent from the TLAX 1007 through the signal line 1201 in accordance with the level-3 guest address translation architecture, and if the level-3 guest PX (GPX) is larger, the DATCLT 1002 reports it to the CU 1001 through the signal line 1108 to stop the subsequent address translation operation.

The DATCTL 1002 further issues to the SELB 1005 through the signal line 1303 a command to extract and send to the signal line 1301 only the page table origin address data (GPTO) of the content of the STER 1012 sent through the signal line 1207, and issues to the SELA 1006 through the signal line 1304 a command to extract the PX field (GPX) of the GVA which is the content of the GTLAR 1015 sent through the signal line 1210, edit it such as shift or zero insertion in accordance with the level-3 guest address translation architecture and send it to the signal line 1302.

The AA 1003 adds the level-3 guest page table origin address (GPTO) and the PX field (GPX) of the GVA sent through the signal lines 1301 and 1302 (FIG. 9), respectively, and sets the sum into the TAL 1004. The address set in the TAL 1004 is the level-3 real address (level-2 virtual address) of the level-3 guest page table entry (GPTE), and it is sent to the CU 1001 through the signal line 1109.

Step 516

The CU 1001 prefix-translates the level-3 read address (GR) of the GPTE sent through the signal line 1109 by using the level-3 guest prefix value and sets it into the HTLAR 1014 through the signal line 1106. The address set in the HTLAR 1014 is the level-3 absolute address (GA) of the GPTE.

Step 517

The step 517 is same as the step 504 except that the level-3 absolute address of the GPTE is replaced by the level-3 absolute address of the GSTE.

Step 518

The step 518 is same as the step 505 except that the level-3 absolute address of the GPTE is replaced by the level-3 absolute address of the GSTE.

The address set in the TAL 1004 is the level-2 virtual address of the GPTE and it is equal to the level-2 real address of the GTPE when the address translation mode bit of the PSW of the level-2 guest is "0". When the address translation mode bit of the level-2 PSW is "0", the process proceeds to the step 524. In the present embodiment, it is assumed that the bit is "1".

The level-2 virtual address (HV) of the GPTE set in the TAL 1004 is sent to the CU 1001 through the signal line 1109.

Step 519

The CU 1001 sets the level-2 virtual address (HV) of the GPTE sent through the signal line 1109 into the HTLAR 1014 through the signal line 1106 and also sets it into the TLAX 1007 through the signal line 1101.

Figure 11D:
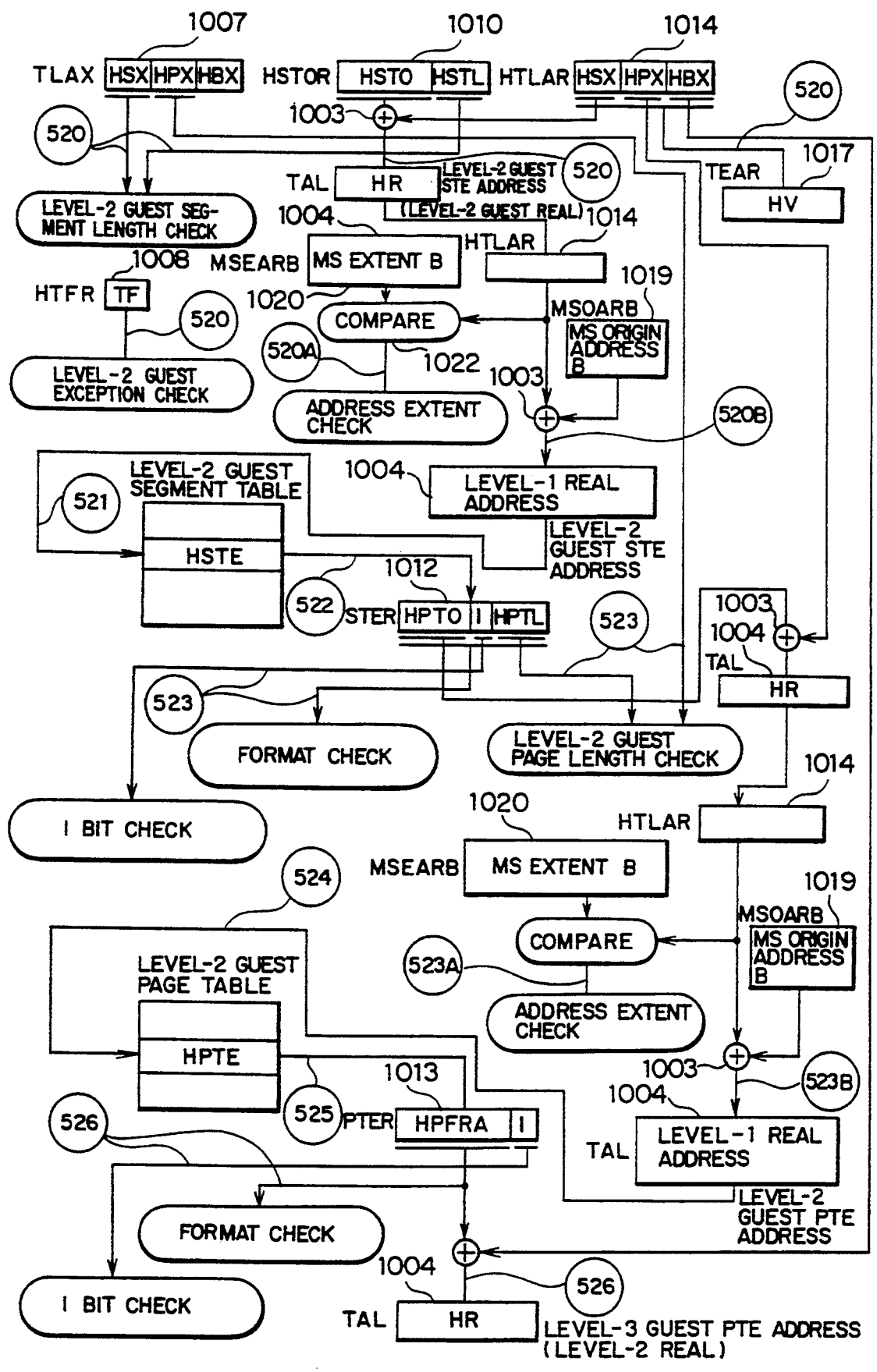
Figure 11E:
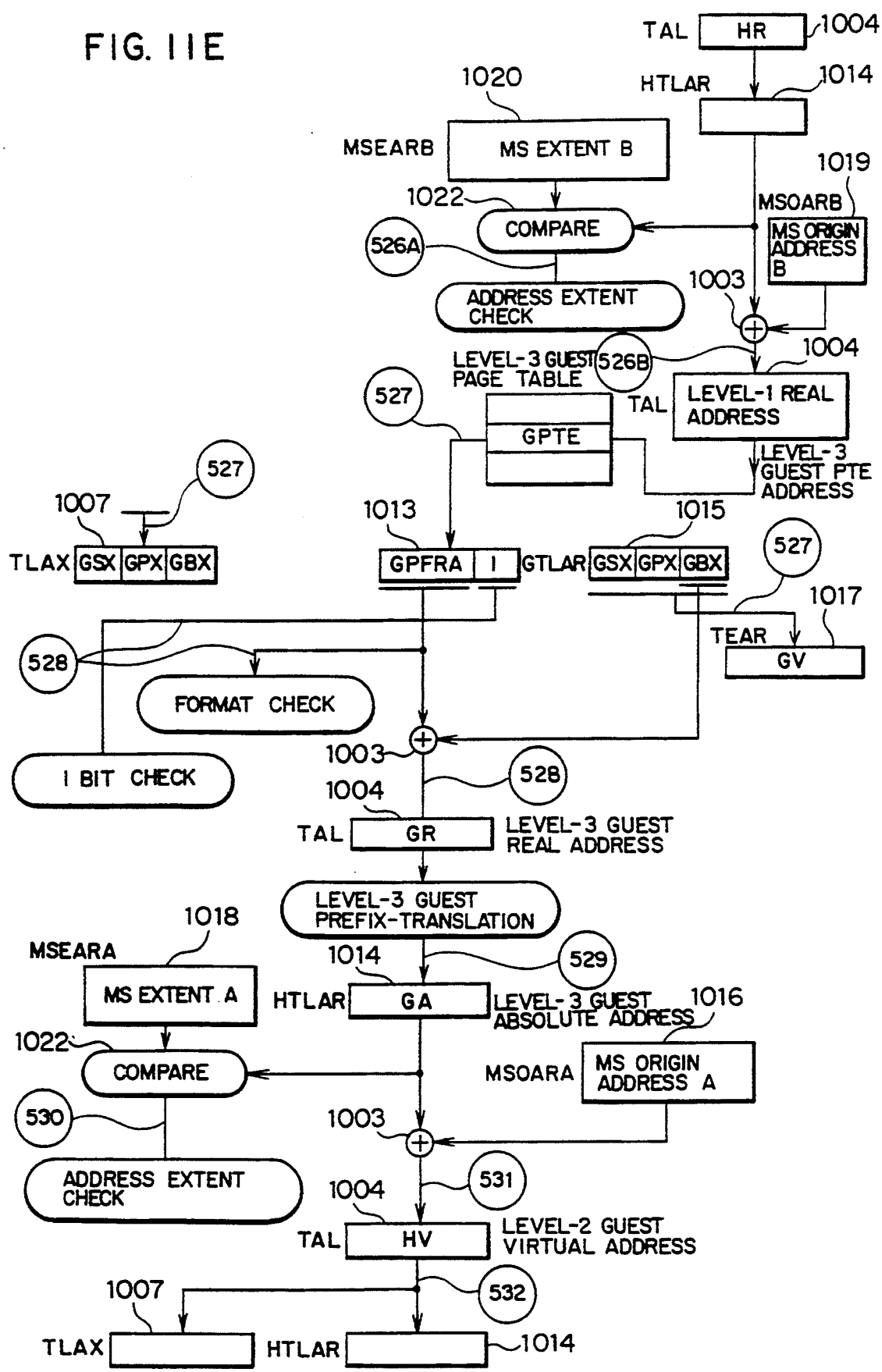

The process in the steps 520 to 526 is now explained (FIG. 11D).

Step 520

In the step 520 is similar to the step 507, and the check of the invalid format, the comparison of the level-2 guest segment length (HSTL) and the level-2 guest SX (HSX), and the addition of the level-2 guest segment table origin address (HSTO) and the level-2 guest SX (HSX) are carried out.

Step 520A

The step 520A is similar to the step 507A.

Step 520B

The step 520B is similar to the step 507B.

Step 521

The step 521 is similar to the step 508.

Step 522

The step 522 is similar to the step 509.

Step 523

The step 523 is similar to the step 510. The check of the invalid bit (I bit) of the HSTE, the check of the format of the HSTE, the comparison of the level-2 guest page table length (HPTL) and the level-2 guest PX field (HPX), and the addition of the level-2 guest page table origin address (HPTO) and the level-2 guest PX field (HPX) are carried out. The address of the HPTE determined by the TAL 1004 is sent to the CU 1001.

Step 523A

The step 523A is similar to the step 510A.

Step 523B

The step 523B is similar to the step 510B.

Step 524

The step 524 is similar to the step 511.

Step 525

The step 525 is similar to the step 512.

Step 526

The step 526 is similar to the step 513. The check of the invalid bit (I bit) of the HPTE, the check of the format, and the addition of the PFRA (HPFRA) of the PTER 1013 and the BX field (HBX) of the HTLAR 1014 are carried out, and the sum is set into the TAL 1004. The address set in the TAL 1004 is the level-2 real address (HR) of the level-3 guest PTE and it is sent to the CU 1001 through the signal line 1109.

Step 526A

The step 526A is same as the step 513A except that the GSTE is replaced by the GPTE.

Step 526B

The step 526B is same as the step 513B except that the GSTE is replaced by the GPTE.

Step 527

The CU 1001 issues to the SELA 1006 through the signal line 1304 a command to send the content of the GTLAR 1015 and set it into the TEAR 1017. It also sets the GVA into the TLAX 1007 through the signal line 1101. It further sets the GPTE into the PTER 1013 and reports it to the DATCTL 1002 through the signal line 1108.

Step 528

When the DATCTL 1002 receives the report of the completion of the execution of the step 527 through the signal line 1108, it checks if the GPTE invalid bit (I bit) of the PTER 1013 is "1" in accordance with the level-3 guest address translation architecture, and if the invalid bit is "1", it reports it to the CU 1001 through the signal line 1108 to stop the subsequent address translation operation.

The DATCTL 1002 also sends to the SELB 1005 through the signal line 1303 a command to send the content of the PTER 1013 to the signal line 1305 to check the format of the GPTE in accordance with the level-3 guest address translation architecture, and if the format is invalid, it reports it to the CU 1001 through the signal line 1108 to stop the subsequent address translation operation.

The DATCTL 1002 also preserve the storage protection bit of the GPTE in the DATCTL 1002 by the corresponding architecture.

The DATCTL 1002 further issues to the SELB 1005 through the signal line 1303 a command to edit only the level-3 guest PFRA field (GPFRA) of the content of the PTER 1013 sent through the signal line 1208 in accordance with the level-3 guest address translation architecture and send it to the signal line 1301, and issues to the SELA 1006 through the signal line 1304 a command to extract the BX field (GBX) of the GVA sent through the signal line 1210, edit it such as shift and zero insertion in accordance with the level-3 guest address translation architecture, and send it to the signal line 1302.

The AA 1003 adds the level-3 guest PFRA (GPFRA) and the BX field of the GVA (GBX) sent through the signal lines 1301 and 1302, respectively, and sets the sum into the TAL 1004. The address set in the TAL 1004 is the level-3 real address (GR) and it is sent to the CU 1001 through the signal line 1109. Step 529

The CU 1001 prefix-translates the level-3 real address (GRA) sent through the signal line 1109 by using the level-3 guest prefix value, and sets it into the HTLAR 1014 through the signal line 1106. The address set in the HTLAR 1014 is the level-3 absolute address of the level-3 guest.

Step 530

The step 530 is same as the step 504 except that the guest level-3 absolute address is replaced by the GSTE level-3 absolute address.

Step 531

The step 531 is same as the step 505 except that the guest level-3 absolute address is replaced by the GSTE level-3 absolute address.

The address set in the TAL 1004 is the level-2 virtual address of the level-3 guest and it is equal to the level-2 real address of the level-3 guest when the address translation mode bit of the PSW of the level-2 guest is "0". When it is "0", the process proceeds to the step 540. In the present embodiment, it is assumed that the bit is "1".

The level-2 virtual address (HV) of the level-3 guest set in the TAL 1004 is sent to the CU 1001 through the signal line 1109.

Step 532

The step 532 is same as the step 519 except that the level-2 virtual address of the GPTE is replaced by the level-2 virtual address of the level-3 guest.

Figure 11F:
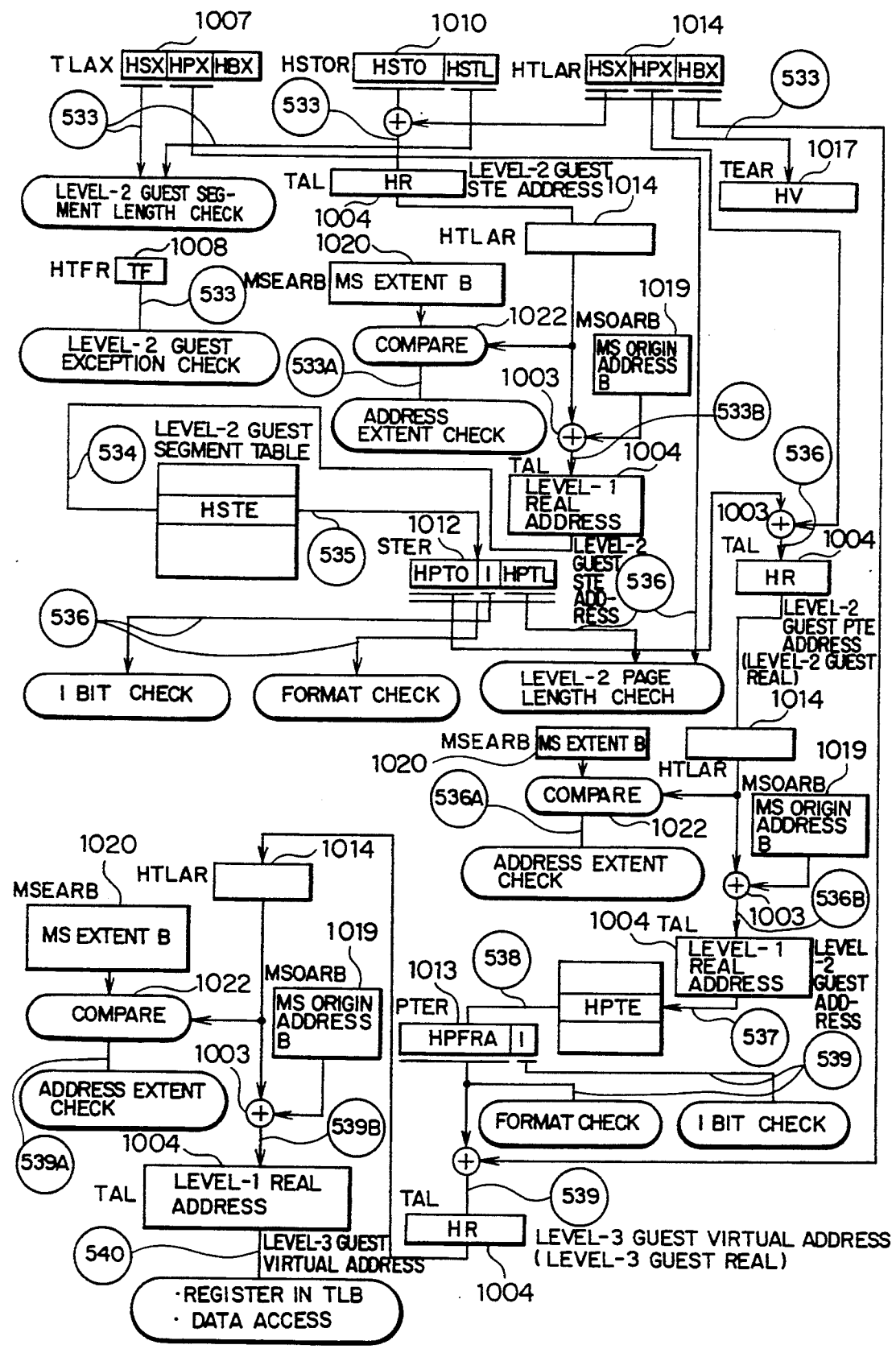

The process in the steps 533 to 540 is now explained (FIG. 11F).

Step 533

The step 533 is same as the step 507.

Step 533A

The step 533A is same as the step 507A.

Step 533B

The step 533B is same as the step 507B.

Step 534

The step 534 is same as the step 509.

Step 535

The step 535 is same as the step 509.

Step 536

The step 536 is same as the step 510.

Step 536A

The step 536A is same as the step 510A.

Step 536B

The step 536B is same as the step 510B.

Step 537

The step 537 is same as the step 511.

Step 538

The step 538 is same as the step 512.

Step 539

The step 539 is same as the step 513. The address set in the TAL 1004 is the level-2 real address of the level-3 guest and it is sent to the CU 1001 through the signal line 1109.

Step 539A

The step 539A is same as the step 513A except that the level-2 absolute address of the GSTE is replaced by the level-2 absolute address of the level-3 guest.

Step 539B

The step 539B is same as the step 513B except that the level-2 absolute address of the GSTE is replaced by the level-2 absolute address of the level-3 guest.

Step 540

The CU 1001 receives the level-1 absolute address through the signal line 1109 and reads the common segment bit and the storage protection bit preserved in the DATCTL 1002 through the signal line 1108. Then, it sends a read request for data to the main storage.

The embodiment of the present invention has thus been described. The level-3 guest virtual address may be read from the GTLAR 1015 and resent to the CU 1001, and the STER 1012 and the PTER 1013 may share one register. Further, the HSTOR 1010 and the GSTOR 1011 may share one register and the CU 1001 may select the use of the register. The TLAX 1007 and the HTLAR 1014 may share one register.

The HTLAR 1014 and the GTLAR 1015 may share one register and the CU 1001 may select the use of the register.

In the flow charts of FIGS. 10A to 10C, the respective steps may be competed or separated as required.

In the address translation process in the embodiment of the present invention, the step 706 shown in FIG. 6 is a simple address translation step including the check of the main storage extent XB and the addition of the main storage origin address B. When the same function is to be attained without this step, it is necessary for the level-1 OS to prepare a shadow translation table in place of the address translation table of the level-2 OS in accordance with the address translation table prepared by the level-2 OS in the step 705, and the main storage extent XB and the main storage origin address B. Thus, the step 706 plays an important role in the present invention although it is a simple address translation step.

I claim:

1. A method of translating an address generated in a plurality of virtual machines constructed in a virtual machine system including a real machine into a level-1 absolute address, comprising the steps of:

constructing a level-2 virtual machine under a control of a level-1 operating system (OS) operating on said real machine (level-1);

constructing a level-3 virtual machine under a control of a different operating system (OS) operating on said level-2 virtual machine;

translating a level-3 virtual address generated in said level-3 virtual machine to a level-3 absolute address;

adding a first predetermined main storage address to said level-3 absolute address to obtain a level-2 virtual address;

translating said level-2 virtual address to a level-1 virtual address; and adding a second predetermined main storage address to said level-1 virtual address to translate said level-1 virtual address to a level-1 absolute address.

2. A method of translating an address according to claim 1, further comprising the steps of:

determining whether said level-2 virtual address is within a first predetermined main storage area; and determining whether said level-1 absolute address is within a second predetermined main storage area.

3. A virtual machine system having an address translation function, comprising:

a real machine under control of a level-1 operating system;

a plurality of virtual machines implemented using said real machine, said plurality of virtual machines comprising a level-2 virtual machine under control of said level-1 operating system, and a level-3 virtual machine constructed under control of a different operating system operating on said level-2 virtual machine;

a holding means for simultaneously holding sets each including main storage address information and main storage area information, each of said sets defining storage parameters with respect to said level-2 virtual machine and said level-3 virtual machine of said plurality of virtual machines;

a first translator for translating a level-3 virtual address generated in said level-3 virtual machine to a level-3 absolute address;

a first adder for adding a first predetermined main storage address to said level-3 absolute address to obtain a level-2 virtual address;

a second translator for translating said level-2 virtual address to a level-1 virtual address; and a second adder for adding a second predetermined main storage address to said level-1 virtual address to translate said level-1 virtual address to a level-1 absolute address.

4. A virtual machine system according to claim 3, further comprising:

a reading means for reading said sets of main storage address information and said main storage area information one by one in accordance with a level of an address translation table to generate a translated address.

5. A virtual machine system according to claim 3, further comprising:

a selecting means for selecting one of said main storage address information as said second predetermined main storage address when a main storage of a real machine is accessed.

6. A virtual machine system according to claim 4, further comprising:

a selecting means for selecting one of said main storage address information as said second predetermined main storage address when a main storage of a real machine is accessed.

7. A virtual machine system according to claim 3, further comprising:

a referencing means for referencing only an address translation table of said virtual machine system for address translation and preventing access to an incorrect real main storage area even when an error is included in said address translation table of said virtual machine, said error being detected on a basis of a comparison of a calculated absolute address value to a value of said main storage area information.

8. A virtual machine system according to claim 4, further comprising:

a referencing means for referencing only said address translation table of said virtual machine system for address translation and preventing access to an incorrect real main storage area even when an error is included in said address translation table of said virtual machine, said error being detected on a basis of a comparison of a calculated absolute address value to a value of said main storage area information.

9. A virtual machine system according to claim 5, further comprising:

a referencing means for referencing only an address translation table of said virtual machine system for address translation and preventing access to an incorrect real main storage area even when an error is included in said address translation table of said virtual machine, said error being detected on a basis of a comparison of a calculated absolute address value to a value of said main storage area information.

10. A method of translating an address in a virtual machine system by operating a level-1 operating system (OS) of a real machine (level-1), constructing a level-2 virtual machine under a control of said level-1 OS, operating a different operating system (OS) on said level-2 virtual machine, and constructing a level-3 virtual machine under a control of said different OS, said method comprising the steps of:

a first step of translating a level-3 virtual address generated in said level-3 virtual machine to a level-3 real address by using a first address translation table generated by an OS operating on said level-3 virtual machine and adding a first predetermined main storage address to said level-3 real address to generate a level-2 virtual address;

a second step of translating a level-2 virtual address to a level-2 real address by using a second address translation table generated by said different OS operating on said level-2 virtual machine and adding a second predetermined main storage address to said level-2 real address to generate a level-1 virtual address; and a third step of adding a third predetermined main storage address to said level-1 virtual address to generate a level-1 absolute address.

11. A method of translating an address according to claim 10, wherein said first step includes a step of determining whether said level-2 virtual address is within a first predetermined main storage area, and said third step includes a step of determining whether said level-1 absolute address is within a second predetermined main storage area.

* * * * *